United States Patent
Vida et al.

(10) Patent No.: US 11,792,365 B1
(45) Date of Patent: Oct. 17, 2023

(54) MESSAGE DATA ANALYSIS FOR RESPONSE RECOMMENDATIONS

(71) Applicant: Amazon Technologies, Inc., Seattle, WA (US)

(72) Inventors: Darvin Vida, Seattle, WA (US); Maksim Surguy, Federal Way, WA (US); Christina Siegfried, Fort Worth, TX (US); Matthew Giuliari, Seattle, WA (US); Robert Mark Pickard, Encinitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 17/399,688

(22) Filed: Aug. 11, 2021

(51) Int. Cl.
| | |
|---|---|
| H04N 7/14 | (2006.01) |
| H04L 51/10 | (2022.01) |
| G06F 40/279 | (2020.01) |
| G10L 15/22 | (2006.01) |
| G10L 15/26 | (2006.01) |
| G10L 25/57 | (2013.01) |
| G06V 40/16 | (2022.01) |

(52) U.S. Cl.
CPC .......... *H04N 7/147* (2013.01); *G06F 40/279* (2020.01); *G06V 40/175* (2022.01); *G10L 15/22* (2013.01); *G10L 15/26* (2013.01); *G10L 25/57* (2013.01); *H04L 51/10* (2013.01)

(58) Field of Classification Search
CPC .... H04N 7/147; G06F 40/279; G06V 40/175; G10L 15/22; G10L 15/26; G10L 25/57; H04L 51/10
See application file for complete search history.

(56) References Cited

U.S. PATENT DOCUMENTS

| | | | |
|---|---|---|---|
| 2009/0055484 A1* | 2/2009 | Vuong | G06Q 10/107 345/619 |
| 2013/0293584 A1* | 11/2013 | Anderson | H04L 67/131 345/633 |
| 2021/0056769 A1* | 2/2021 | Scapel | G06T 19/20 |

\* cited by examiner

*Primary Examiner* — Phung-Hoang J Nguyen
(74) *Attorney, Agent, or Firm* — Lee & Hayes, P.C.

(57) ABSTRACT

Systems and methods for using message data analysis for response recommendations are disclosed. For example, personalized emojis may be generated utilizing one or more image-capture techniques and/or analysis of image data depicting a user. Those personalized emojis may be saved to a library of personalized emojis may be utilized to respond to received messages. Analysis of received message may also be performed, and the results of the analysis may be utilized to recommend automatic responses, including previously-generated personalized emojis.

20 Claims, 13 Drawing Sheets

MESSAGE DATA ANALYSIS FOR RESPONSE RECOMMENDATIONS

BACKGROUND

Communication of messages in multiple formats (e.g., text, audio, video) between devices has become common. Such devices have various input and output capabilities. Described herein are improvements in technology and solutions to technical problems that can be used to, among other things, enhance communication of messages between devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 10 illustrates a conceptual diagram of components of an example device from which message data may be received and/or sent to.

DETAILED DESCRIPTION

Figure 1:
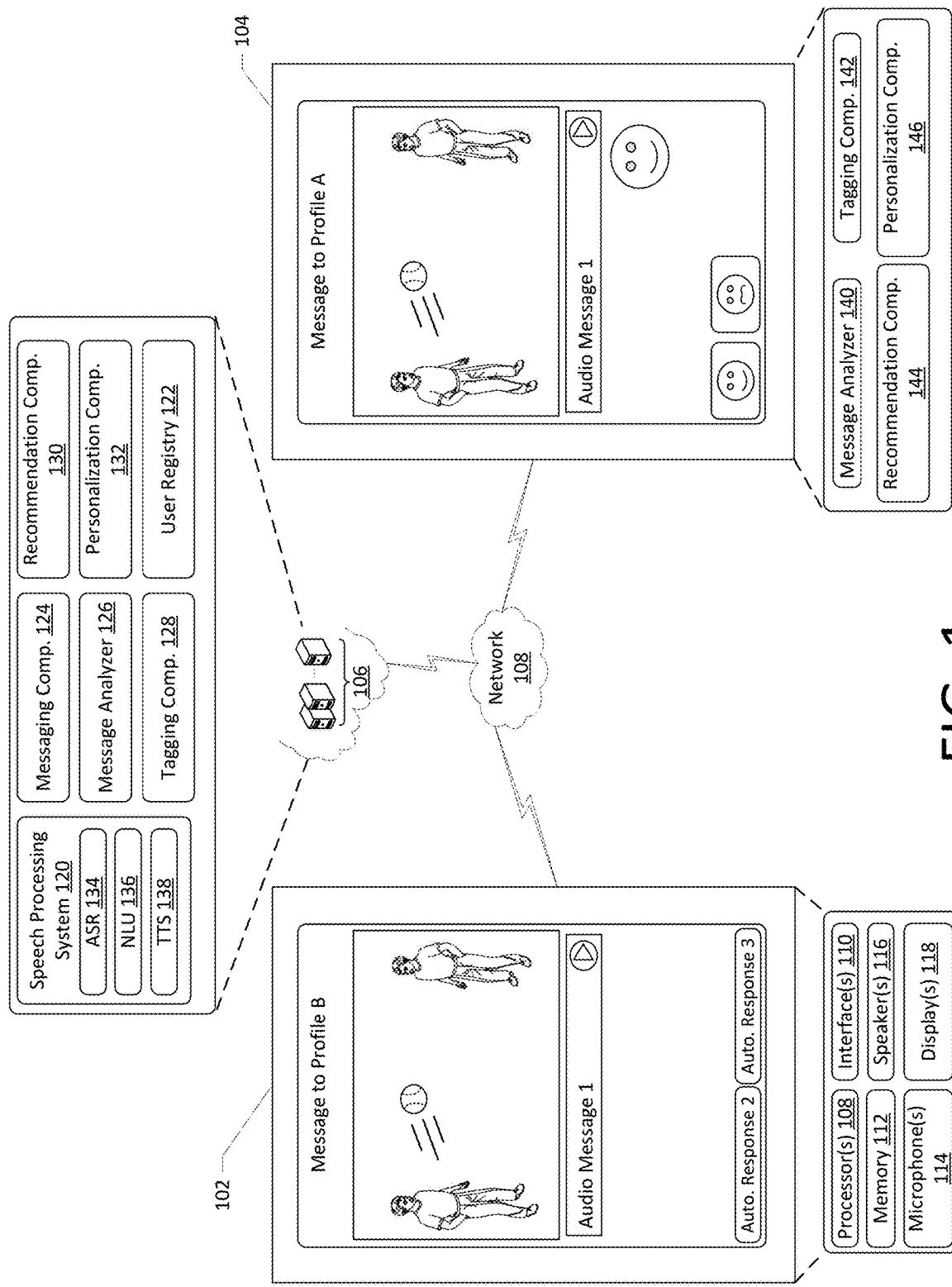
FIG. 1 illustrates a schematic diagram of an example environment for message data analysis for response recommendations.

Systems and methods for message data analysis for response recommendations are disclosed. Take, for example, an environment (such as a home, hotel, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, televisions, appliances like refrigerators and microwaves, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example. These devices may include multiple input and/or output components. For example, some devices may include a screen for displaying text and/or images as well as a speaker for outputting audio. In other examples, the devices may be only configured to display text and/or images. In still other examples, the devices may only be configured to output audio, such as in examples where the devices do not include a display.

In examples where one or more of the devices includes a camera and a screen, images of a user may be captured and corresponding image data may be utilized to generate personalized emojis that may be utilized, for example, in message sent from the devices. For example, a personalization component may be configured to personalize automatic responses, such as for responding to message data sent as described herein. At least a portion of the personalized automatic responses may include personalized emojis or otherwise images of a user performing various facial expressions such as smiling, frowning, looking surprised, looking sad, looking excited, etc. To facilitate the generation of these personalized emojis, one or more techniques to capture images of the user with various facial expressions may be utilized. In one example, a user interface of a device operated by the user may be caused to display commands for the user to perform to capture the images of the user. For example, a reference emoji such as a smiley-face emoji may be displayed by the user interface with a command for the user to mimic the smiley face. In instances where the device includes a camera, the camera may be utilized to capture an image of the user while mimicking the smiley-face emoji. This process may be repeated for other facial expressions. In another example, the user interface may display a photograph that is selected to elicit a given facial expression. For example, a first photograph of something funny may elicit a given facial expression, while another photograph of something sad may elicit another facial expression. Again, a camera of the device may capture images depicting the user with the various facial expressions.

In these examples, image analysis techniques, such as computer vision techniques, may be utilized to determine when to capture an image of the user having a given facial expression. In other examples, a buffer of captured images may be maintained by the device, and the corresponding image data may be analyzed to determine which image(s) are most likely to depict the user with the given facial expression. In these and other examples, the selected images may be displayed for the user to review and select which of the images are to be utilized as personalized emojis. When computer vision techniques are utilized as described herein, the system may determine a facial expression to associate with a given emoji. For example, metadata associated with the emoji may be associated with metadata from the computer vision analysis. By way of example, metadata from analysis of given image data may result in identifiers such as smiling, tongue out, wide eyes, etc. This metadata may be mapped to an appropriate emoji, such as a smiley face emoji and/or a tongue-out emoji, for example.

In still another example, automatic capture of images may be performed during a video call that includes the user. For example, the user may provide consent and/or a request for images to be captured during a video call and/or otherwise when video of the user is being captured. The personalization component may be configured to continuously capture frames of the video data and to determine if the given frames depict a user reaction that may be converted to a personalized emoji. For example, data associated with the video may be analyzed to determine whether voice amplitude changes have occurred, whether there is motion of the user over a given number of frames, whether portions of the user's face are moving indicating the start or end of a facial expression, whether keywords are spoken by the user, detection of certain acoustic events such as clapping, laughing, etc. These signals may be utilized as a trigger event for flagging given frames of the video as potential personalized emojis. The flagged frames may be presented to the user for review and selection for inclusion in a library of personalized emojis, along with, in examples, display of the expression determined by the personalization component to be associated with the frame(s). The user may select some or all of the frames and image data corresponding to the frames may be saved in a personalized emoji library. Thereafter, the personalized emojis may be utilized as automatic responses to message data and may be recommended for use as described herein.

When motion in the video is utilized as a trigger event for capturing and/or selecting images as potential personalized emojis, computer vision techniques may be utilized to determine when facial features and/or movement of facial features of a user indicates that the user has a facial expression predetermined to be desirable for generating a personalized emoji. For example, the computer vision techniques may be utilized to determine that a mouth portion of the user depicted in an image is in the position of a smile, a frown, an open mouth, etc. Additional features of the user's face may also be analyzed, such as the raising and/or lowering of eyebrows, the widening and/or squinting of eyes, the raising and/or lowering of a cheek portion of the face, movement of hands, etc. Some or all of this analysis may be utilized to determine that the features of the user as depicted in the image indicate that a predetermined facial expression has been captured for generation of personalized emojis.

When audio data is utilized to determine if the trigger event has occurred, characteristics of the audio data may be analyzed to determine if audio associated with the video indicates that a portion of the video is associated with the user making a given facial expression. For example, an amplitude of the audio data may be analyzed to determine when variations in amplitude occur. For example, during a video call, an amplitude of the audio data may, during a first period of time, be relatively constant. This may occur when two users are talking in a normal tone and at a normal volume. However, at some point during the call the amplitude associated with one or both of the users' voices may increase, such as above a threshold amount. In these instances, the amplitude change may indicate that something important in the conversation has occurred and/or that one or more of the users is laughing or otherwise producing sound that is louder than a normal conversation. These portions of the video call may be flagged for capture of images and/or for saving the corresponding image data as potential personalized emojis. The audio data analysis may also include the use of automatic speech recognition to determine whether one or more words spoken by one or more of the users indicates that the user(s) are producing given facial expressions. For example, when one of the users says "wow, that is great," such a phrase may indicate that one or more of the users is likely smiling and/or producing facial expressions indicating surprise and/or excitement. Again, these portions of the video call may be flagged for capture of images and/or for saving the corresponding image data as potential personalized emojis.

Once an image is captured that is to be converted to a personalized emoji, the system may perform one or more operations to generate data representing the personalized emojis. For example, the image data may be saved, such as to a user registry and/or database of emojis and then the image data may be associated with a keyboard application and/or function to be used when typing messages and/or content. By way of example, data may be generated that associates the image data to functionality of a user interface such that when a user provides user input via the user interface requesting use of the personalized emoji, the system retrieves the image data an utilizes the image data as a personalized emoji, such as in a message.

Additionally, to implement the use of the image data as a personalized emoji, a character encoding standard, such as the American Standard Code for Information Interchange (ASCII), may be utilized. The character encoding may include representing text in computing devices. A control code chart may be utilized as part of the character encoding. In examples, a predefined number of specified characters are encoded into a given number of integers. The At least a portion of the encoded characters may be printable and/or otherwise viewable, and for these encoded characters at least a portion of them may be associated with the personalized emojis as described herein. For example, a ASCII code may be assigned to a personal emoji, and/or may replace one or more standard or otherwise preexisting emojis. For example, if a preexisting emoji is a "smiley face" emoji, the ASCII code assigned to that smiley face emoji may be instead associated with image data representing a user smiling.

Additionally, as opposed to the selection of a photograph to be utilized as a personalized emoji, the image analysis techniques described herein may be utilized to determine which of several images is best suited to represent a personalized emoji. The techniques may also include the modification of the image, such as image resizing, redaction, background modification, etc. such that the resulting personalized emoji focuses on the facial expression of the depicted user and corresponds to a character emoji. Additional details on the analysis of image data to determine which image to utilize and how to identify what portions of an image are to be utilized for generation of a personalized emoji are described below.

Additionally, or alternatively, the message analysis operations described herein may be utilized to select one or more automatic responses to recommend to a user, which may include one or more of the generated personalized emojis. For example, when a message is received at a device, one or more automatic responses may be presented to a user as options for responding to the message. In a text message example, a text message may be received at a device and one or more automatic responses may be suggested, such as "thank you," "yes," "no," "sounds good." A user of the device may select one or more of the automatic responses and the response(s) may be sent without the user needing to type the response and press send. As disclosed herein, a recommendation component may be utilized to determine which automatic responses to recommend to a user of a receiving device based at least in part on analysis of the message data sent to the receiving device. When the message data is related to a photograph of two people playing baseball, for example, a recommendation component may be configured to determine which automatic responses are related to baseball and/or sports and/or the users at issue and/or photographs, etc. These automatic responses that are related to the content of the message data may be prioritized for recommending to the user over other potential automatic responses. Additionally, the output configuration of the device that sent the message data may be utilized by the recommendation component to determine which automatic responses should be recommended to the user. For example, even when the receiving device is a device without a screen, if the sending device includes a screen and/or if the message data included message types associated with displaying information, such as message types having image data, the recommendation component may recommend an automatic response that is image-based.

In addition to the above, a user may desire to send a photograph, video, and/or other message that includes image data, such as an animation, drawing, etc. The user may select the message to send along with account data to send the message to. When a recipient device associated with the account data includes a screen, the message data corresponding to the message may be sent to the recipient device and that device may display the photograph, video, and/or other message that includes image data. However, certain devices may not include a screen. In these examples, the recipient device may not include functionality for displaying the photograph, video, and/or other message that includes image data, or may simply be inconvenient to see the screen when it is being used (e.g., phone is in user's pocket, bag, or otherwise not easily visible to the user). In these and other examples where the message type is not supported by the capabilities of the recipient device, conversion of messages into message types that are supported by the recipient device is useful.

To do so, a messaging component of a system configured to facilitate the sending of messages between devices may receive message data from a sending device that is directed to a recipient device. The messaging component may be configured to utilize an identifier of the recipient device and/or account data associated with the recipient device to determine the supported capabilities of the recipient device. For example, a user registry may be queried to determine, for the recipient device at issue, whether the recipient device includes a screen for displaying images and/or includes a speaker for outputting audio. The messaging component may also be configured to determine a message type of the message data. For example, the messaging component may be configured to determine when message data includes image data and/or audio data and/or text data. When the messaging component determines that a message type of the message data is not supported for output by the recipient device, the message component may query a message analyzer for generating a representation of the message that is supported for output on the recipient device.

For example, the message analyzer may receive the message data and an indication of what message types are supported for output by the recipient device. By way of example, the message data may include image data corresponding to an image and the indication of the message type supported for output by the recipient device may be audio-type messages, such as in scenarios where the recipient device does not include a screen, the screen is off, the user is determined to be away from the device, the device is in a mode that causes visual content to be presented audibly, etc. In these examples and others, the message analyzer may determine that the image data from the message is to be converted into audio data representing an audible description of objects and/or activities depicted in the image. The message analyzer may also be configured to analyze the message data to determine attributes of the message data to be utilized for converting the message data into a message type supported by the recipient device. For example, the message analyzer may, when the message data includes image data, analyze the image data to determine what objects are depicted in the image data and/or what activities are depicted in the image data. By way of example, a given message may include a photograph of two users with one user throwing a baseball to another user. The message analyzer may analyze the image data to determine that the image depicts two users, and in examples the identities of the users, a baseball, and positioning of the users with respect to each other and the baseball. To make these determinations, the message analyzer may utilize computer vision techniques, which are described in more detail below.

In addition to the computer vision techniques utilized to analyze image data, other forms of data analysis may be performed. For example, in instances where the message data also includes text data and/or audio data representing an annotation and/or a comment associated with the image data, the text data and/or audio data may be utilized to determine what is depicted in the image. For example, the sending user may, in addition to sending the photograph of two users playing baseball, send a text message and/or an audio clip commenting on the photograph, such as "look at that throw!" When the comment is audio data, automatic speech recognition techniques may be utilized to generate text data representing the user comment. The text data may be analyzed to further assist in identifying objects and/or activities depicted in the image. For example, the comment of "look at that throw!" may result in detection of the word "throw" from the comment. The output of the image analysis may have identified user motion from the image data and/or an arm moving, and the output from the text analysis may be utilized by the message analyzer to refine the output to "throwing" and/or "throw a baseball." In still other examples, the results of the text analysis may result in increasing and/or decreasing a confidence value at which objects and/or activities were detected from the image data analysis.

In addition to the above, analysis of the message category associated with the message may be performed by the message analyzer. For example, a given message may be associated with a given message category or otherwise a content domain. Example message categories may be photographs, recipes, Internet websites links, location markers, etc. The message analyzer may receive data indicating the message category for a given message and may utilize the message category to inform detection of objects and/or activities associated with the message data. For example, when a message is associated with a photograph message type, output from the message analysis may include "photograph," "photograph from User C," etc. When a message is associated with a recipe message type, output from the message analysis may include "recipe," "Cookbook A," etc.

Data indicating the results from the message analyzer may be sent to a tagging component, which may be configured to generate tagging data indicating the identified objects from the image data as well as identifiers of potential activities in which one or more of the objects are engaged in. Using the example above, the tagging component may generate tag data indicating that the image data depicts "User A," "User B," "baseball," "throwing," "baseball mitt," "baseball hat," "arm moving," etc. The tagging data may also indicate the message type of the message, such as "photograph," "recipe," etc.

A message generator may be configured to receive the tagging data and utilize the tagging data to generate a representation of the message that is supported for output by the receiving device. Using the example above, the message generator may receive the tagging data associated with the objects and/or activities depicted in an image and may utilize the tagging data to generate audio data representing an audible description of the objects and/or activities. To do so, the message generator may utilize natural language understanding techniques, described more fully below, to generate text data representing a one or more sentences describing the image. Using the example above where the output from the tagging component may be "User A," "User B," "baseball," "throwing," "baseball mitt," "baseball hat," "photograph," etc., the message generator may generate text data representing these objects/activities, such as "photograph of User A throwing a baseball to User B." A text-to-speech component may be utilized to generate audio data from the text data output by the message generator. Additional details on text-to-speech techniques are provided elsewhere herein. Thereafter the audio data representing the audible description of the image may be sent to the recipient device for output by a speaker of the recipient device.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for using message data analysis for message modality conversion and response recommendations. The system 100 may include, for example, one or more devices 102, 104. In certain examples, the devices 102, 104 may be a voice-enabled device (e.g., Echo devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102, 104 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. The devices 102, 104 may be configured to send data to and/or receive data from a system 106, such as via a network 108. It should be understood that where operations are described herein as being performed by the system 106, some or all of those operations may be performed by the devices 102, 104. It should also be understood that anytime the system 106 is referenced, that system may include any system and/or device, whether local to an environment of the devices 102, 104 or remote from that environment. Additionally, it should be understood that a given space and/or environment may include numerous devices 102, 104. It should also be understood that when a "space" or "environment" is used herein, those terms mean an area and not necessarily a given room, building, or other structure, unless otherwise specifically described as such. As described herein, some of the devices 102 may be described as sending devices 102 indicating that message data is being sent from those devices to receiving devices 104. However, it should be understood that sending devices 102 may also be configured to receive messages, and receiving devices 104 may also be configured to send messages.

The sending devices 102, may include one or more components, such as, for example, one or more processors 108, one or more network interfaces 110, memory 112, one or more microphones 114, one or more speakers 116, and/or one or more displays 118. The microphones 114 may be configured to capture audio, such as user utterances, and generate corresponding audio data. The speakers 116 may be configured to output audio, such as audio corresponding to audio data received from another device and/or the system 106. The devices 102 may also include displays 118 that may be configured to display images corresponding to image data, such as image data received from the system 106 and/or one or more other devices. The device 102 may also include sensors that may include any component configured to detect an environmental condition associated with the devices 102 and/or the environment associated with the devices 102. Some example sensors may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors, usage data and/or account data may be utilized to determine if an environmental condition is present.

The receiving devices 104 may include similar components to the sending devices 102. For example, the receiving devices 104 may include one or more processors, one or more network interfaces, memory, one or more microphones, and/or one or more speakers. In this example, the receiving devices 104 may be unassociated with a display. The components of the receiving devices 104 may be similar and may perform the same or similar functionality as the sending devices 102.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 108 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 106 may include components such as, for example, a speech processing system 120, a user registry 122, a messaging component 124, a message analyzer 126, a tagging component 128, a recommendation component 130, and/or a personalization component 132. It should be understood that while the components of the system 106 are depicted and/or described as separate from each other in FIG. 1, some or all of the components may be a part of the same system. The speech processing system 130 may include an automatic speech recognition component (ASR) 134 and/or a natural language understanding component (NLU) 136 and/or a text-to-speech component (TTS) 138. Each of the components described herein with respect to the system 106 may be associated with their own systems, which collectively may be referred to herein as the system 106, and/or some or all of the components may be associated with a single system. Additionally, the system 106 may include one or more applications, which may be described as skills. "Skills," as described herein may be applications and/or may be a subset of an application. For example, a skill may receive data representing an intent. For example, an intent may be determined by the NLU component 136 and/or as determined from user input via a computing device. Skills may be configured to utilize the intent to output data for input to a text-to-speech component, a link or other resource locator for audio data, and/or a command to a device, such as the devices 102, 104. "Skills" may include applications running on devices, such as the devices 102, 104, and/or may include portions that interface with voice user interfaces of devices 102, 104.

In instances where a voice-enabled device is utilized, skills may extend the functionality of devices 102, 104 that can be controlled by users utilizing a voice-user interface. In some examples, skills may be a type of application that may be useable in association with personal devices and may have been developed specifically to work in connection with given personal devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the devices 102, 104, and the system 106 are described in detail below. In examples, some or each of the components of the system 106 may include their own processor(s), network interface(s), and/or memory. As such, by way of example, the speech processing system 130 may include and/or be associated with processor(s), network interface(s), and/or memory. The other components of the system 106, such as the message analyzer 136, may include and/or be associated with different processor(s), network interface(s), and/or memory, or one or more of these components may utilize some or all of the same processor(s), network interface(s), and/or memory utilized by the speech processing system 130. These components are described in detail below. Additionally, the operations and/or functionalities associated with and/or described with respect to the components of the system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 106, the user registry 122 may be configured to determine and/or generate associations between users, user accounts, environment identifiers, and/or devices. For example, one or more associations between user accounts may be identified, determined, and/or generated by the user registry 122. The user registry 122 may additionally store information indicating one or more applications and/or resources accessible to and/or enabled for a given user account. Additionally, the user registry 122 may include information indicating device identifiers, such as naming identifiers, associated with a given user account, as well as device types associated with the device identifiers. The user registry 122 may also include information indicating user account identifiers, naming indicators of devices associated with user accounts, and/or associations between devices, such as the devices 102, 104. The user registry 122 may also include information associated with usage of the devices 102, 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 120 may be configured to receive audio data from the primary devices 102 and/or other devices and perform speech-processing operations. For example, the ASR component 134 may be configured to generate text data corresponding to the audio data, and the NLU component 136 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "order ice cream," the NLU component 136 may identify a "order" intent and the payload may be "ice cream." In this example where the intent data indicates an intent to purchase ice cream to be delivered to an environment, the speech processing system 120 may call one or more speechlets to effectuate the intent. Speechlets, as described herein may otherwise be described as applications and may include functionality for utilizing intent data to generate directives and/or instructions. For example, a speechlet associated ordering food may be called. The speechlet may be designated as being configured to handle the intent of ordering food, for example. The speechlet may receive the intent data and/or other data associated with the user utterance from the NLU component 136, such as by an orchestrator of the system 106, and may perform operations to place an order for ice cream to be delivered to a given environment, for example. The system 106 may generate audio data confirming that the order has been placed, such as by the TTS component 138. The audio data may be sent from the system 106 to one or more of the devices 102.

The components of the system 100 are described below by way of example.

In examples where one or more of the devices 102, 104 includes a camera and a screen, images of a user may be captured and corresponding image data may be utilized to generate personalized emojis that may be utilized, for example, in message sent from the devices 102, 104. For example, the personalization component 132 may be configured to personalize automatic responses, such as for responding to message data sent as described herein. At least a portion of the personalized automatic responses may include personalized emojis or otherwise images of a user performing various facial expressions such as smiling, frowning, looking surprised, looking sad, looking excited, etc. To facilitate the generation of these personalized emojis, one or more techniques to capture images of the user with various facial expressions may be utilized. In one example, a user interface of a device 102, 104 operated by the user may be caused to display commands for the user to perform to capture the images of the user. For example, a reference emoji such as a smiley-face emoji may be displayed by the user interface with a command for the user to mimic the smiley face. In instances where the device 102, 104 includes a camera, the camera may be utilized to capture an image of the user while mimicking the smiley-face emoji. This process may be repeated for other facial expressions. In another example, the user interface may display a photograph that is selected to elicit a given facial expression. For example, a first photograph of something funny may elicit a given facial expression, while another photograph of something sad may elicit another facial expression. Again, a camera of the device 102, 104 may capture images depicting the user with the various facial expressions.

In these examples, image analysis techniques, such as computer vision techniques, may be utilized to determine when to capture an image of the user having a given facial expression. In other examples, a buffer of captured images may be maintained by the device 102, 104, and the corresponding image data may be analyzed to determine which image(s) are most likely to depict the user with the given facial expression. In these and other examples, the selected images may be displayed for the user to review and select which of the images are to be utilized as personalized emojis.

In still another example, automatic capture of images may be performed during a video call that includes the user. For example, the user may provide consent and/or a request for images to be captured during a video call and/or otherwise when video of the user is being captured. The personalization component 132 may be configured to continuously capture frames of the video data and to determine if the given frames depict a user reaction that may be converted to a personalized emoji. For example, data associated with the video may be analyzed to determine whether voice amplitude changes have occurred, whether there is motion of the user over a given number of frames, whether portions of the user's face are moving indicating the start or end of a facial expression, whether keywords are spoken by the user, detection of certain acoustic events such as clapping, laughing, etc. These signals may be utilized as a trigger event for flagging given frames of the video as potential personalized emojis. The flagged frames may be presented to the user for review and selection for inclusion in a library of personalized emojis, along with, in examples, display of the expression determined by the personalization component to be associated with the frame(s). The user may select some or all of the frames and image data corresponding to the frames may be saved in a personalized emoji library. Thereafter, the personalized emojis may be utilized as automatic responses to message data and may be recommended for use as described herein.

When motion in the video is utilized as a trigger event for capturing and/or selecting images as potential personalized emojis, computer vision techniques may be utilized to determine when facial features and/or movement of facial features of a user indicates that the user has a facial expression predetermined to be desirable for generating a personalized emoji. For example, the computer vision techniques may be utilized to determine that a mouth portion of the user depicted in an image is in the position of a smile, a frown, an open mouth, etc. Additional features of the user's face may also be analyzed, such as the raising and/or lowering of eyebrows, the widening and/or squinting of eyes, the raising and/or lowering of a cheek portion of the face, movement of hands, etc. Some or all of this analysis may be utilized to determine that the features of the user as depicted in the image indicate that a predetermined facial expression has been captured for generation of personalized emojis.

When audio data is utilized to determine if the trigger event has occurred, characteristics of the audio data may be analyzed to determine if audio associated with the video indicates that a portion of the video is associated with the user making a given facial expression. For example, an amplitude of the audio data may be analyzed to determine when variations in amplitude occur. For example, during a video call, an amplitude of the audio data may, during a first period of time, be relatively constant. This may occur when two users are talking in a normal tone and at a normal volume. However, at some point during the call the amplitude associated with one or both of the users' voices may increase, such as above a threshold amount. In these instances, the amplitude change may indicate that something important in the conversation has occurred and/or that one or more of the users is laughing or otherwise producing sound that is louder than a normal conversation. These portions of the video call may be flagged for capture of images and/or for saving the corresponding image data as potential personalized emojis. The audio data analysis may also include the use of automatic speech recognition to determine whether one or more words spoken by one or more of the users indicates that the user(s) are producing given facial expressions. For example, when one of the users says "wow, that is great," such a phrase may indicate that one or more of the users is likely smiling and/or producing facial expressions indicating surprise and/or excitement. Again, these portions of the video call may be flagged for capture of images and/or for saving the corresponding image data as potential personalized emojis.

Additionally, or alternatively, the message analysis operations described herein may be utilized to select one or more automatic responses to recommend to a user, which may include one or more of the generated personalized emojis. For example, when a message is received at a device, one or more automatic responses may be presented to a user as options for responding to the message. In a text message example, a text message may be received at a device and one or more automatic responses may be suggested, such as "thank you," "yes," "no," "sounds good." A user of the device 102, 104 may select one or more of the automatic responses and the response(s) may be sent without the user needing to type the response and press send. As disclosed herein, the recommendation component 130 may be utilized to determine which automatic responses to recommend to a user of a receiving device based at least in part on analysis of the message data sent to the receiving device. When the message data is related to a photograph of two people playing baseball, for example, a recommendation component may be configured to determine which automatic responses are related to baseball and/or sports and/or the users at issue and/or photographs, etc. These automatic responses that are related to the content of the message data may be prioritized for recommending to the user over other potential automatic responses. Additionally, the output configuration of the device that sent the message data may be utilized by the recommendation component to determine which automatic responses should be recommended to the user. For example, even when the receiving device is a device without a screen, if the sending device includes a screen and/or if the message data included message types associated with displaying information, such as message types having image data, the recommendation component 130 may recommend an automatic response that is image-based.

Additionally, a user may desire to send a photograph, video, and/or other message that includes image data, such as an animation, drawing, etc. The user may select the message to send along with account data to send the message to. When a recipient device 104 associated with the account data includes a screen, the message data corresponding to the message may be sent to the recipient device 104 and that device 104 may display the photograph, video, and/or other message that includes image data. However, certain devices 104 may not include a screen. In these examples, the recipient device 104 may not include functionality for displaying the photograph, video, and/or other message that includes image data. In these and other examples where the message type is not supported by the capabilities of the recipient device 104, conversion of messages into message types that are supported by the recipient device 104 is useful. To do so, the messaging component 124 configured to facilitate the sending of messages between devices 102, 104 may receive message data from a sending device 102 that is directed to a recipient device 104. The messaging component 124 may be configured to utilize an identifier of the recipient device 104 and/or account data associated with the recipient device 104 to determine the supported capabilities of the recipient device 104. For example, the user registry 122 may be queried to determine, for the recipient device 104 at issue, whether the recipient device 104 includes a screen for displaying images and/or includes a speaker for outputting audio. The messaging component 124 may also be configured to determine a message type of the message data. For example, the messaging component 124 may be configured to determine when message data includes image data and/or audio data and/or text data. When the messaging component 124 determines that a message type of the message data is not supported for output by the recipient device 104, the messaging component 124 may query the message analyzer 126 for generating a representation of the message that is supported for output on the recipient device 104.

For example, the message analyzer 126 may receive the message data and an indication of what message types are supported for output by the recipient device 104. By way of example, the message data may include image data corresponding to an image and the indication of the message type supported for output by the recipient device 104 may be audio-type messages, such as in scenarios where the recipient device 104 does not include a screen. In these examples, the message analyzer 126 may determine that the image data from the message is to be converted into audio data representing an audible description of objects and/or activities depicted in the image data. The message analyzer 126 may also be configured to analyze the message data to determine attributes of the message data to be utilized for converting the message data into a message type supported by the recipient device 104. For example, the message analyzer 126 may, when the message data includes image data, analyze the image data to determine what objects are depicted in the image data and/or what activities are depicted in the image data. By way of example, a given message may include a photograph of two users with one user throwing a baseball to another user. The message analyzer 126 may analyze the image data to determine that the image depicts two users, and in examples the identities of the users, a baseball, and positioning of the users with respect to each other and the baseball. To make these determinations, the message analyzer may utilize computer vision techniques.

When image data is described herein as being analyzed, that analysis may include the use of computer vision to identify objects depicted in the image data. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: Lines, edges, and ridges; Localized interest points such as corners, blobs, or points; More complex features may be related to texture, shape, or motion. At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classifying a detected object into different categories; and comparing and combining two different views of the same object. Making the final decision required for the application, for example match/no-match in recognition applications, may then be performed.

In addition to the computer vision techniques utilized to analyze image data, other forms of data analysis may be performed. For example, in instances where the message data also includes text data and/or audio data representing an annotation and/or a comment associated with the image data, the text data and/or audio data may be utilized to determine what is depicted in the image. For example, the sending user may, in addition to sending the photograph of two users playing baseball, send a text message and/or an audio clip commenting on the photograph, such as "look at that throw!" When the comment is audio data, automatic speech recognition techniques may be utilized to generate text data representing the user comment. The text data may be analyzed to further assist in identifying objects and/or activities depicted in the image. For example, the comment of "look at that throw!" may result in detection of the word "throw" from the comment. The output of the image analysis may have identified user motion from the image data and/or an arm moving, and the output from the text analysis may be utilized by the message analyzer to refine the output to "throwing" and/or "throw a baseball." In still other examples, the results of the text analysis may result in increasing and/or decreasing a confidence value at which objects and/or activities were detected from the image data analysis.

In addition to the above, analysis of the message category associated with the message may be performed by the message analyzer 126. For example, a given message may be associated with a given message category or otherwise a content domain. Example message categories may be photographs, recipes, Internet websites links, location markers, etc. The message analyzer 136 may receive data indicating the message category for a given message and may utilize the message category to inform detection of objects and/or activities associated with the message data. For example, when a message is associated with a photograph message type, output from the message analysis may include "photograph," "photograph from User C," etc. When a message is associated with a recipe message type, output from the message analysis may include "recipe," "Cookbook A," etc.

Data indicating the results from the message analyzer 136 may be sent to the tagging component 138, which may be configured to generate tagging data indicating the identified objects from the image data as well as identifiers of potential activities in which one or more of the objects are engaged in. Using the example above, the tagging component 128 may generate tag data indicating that the image data depicts "User A," "User B," "baseball," "throwing," "baseball mitt," "baseball hat," "arm moving," etc. The tagging data may also indicate the message type of the message, such as "photograph," "recipe," etc.

A message generator may be configured to receive the tagging data and utilizing the tagging data to generate a representation of the message that is supported for output by the receiving device 104. Using the example above, the message generator may receive the tagging data associated with the objects and/or activities depicted in an image and may utilize the tagging data to generate audio data representing an audible description of the objects and/or activities. To do so, the message generator may utilize natural language understanding techniques, described more fully below, to generate text data representing one or more sentences describing the image. Using the example above where the output from the tagging component 138 may be "User A," "User B," "baseball," "throwing," "baseball mitt," "baseball hat," etc., the message generator may generate text data representing these objects/activities, such as "photograph of User A throwing a baseball to User B." The TTS component 138 may be utilized to generate audio data from the text data output by the message generator. Additional details on text-to-speech techniques are provided elsewhere herein. Thereafter the audio data representing the audible description of the image may be sent to the recipient device 104 for output by a speaker of the recipient device 104.

Additionally, or alternatively, the message analysis operations described herein may be utilized to select one or more automatic responses to recommend to a user. For example, when a message is received at a device 104, one or more automatic responses may be presented to a user as options for responding to the message. In a text message example, a text message may be received at a device and one or more automatic responses may be suggested, such as "thank you," "yes," "no," "sounds good." A user of the device may select one or more of the automatic responses and the response may be sent without the user needing to type the response and press send. As disclosed herein, the recommendation component 130 may be utilized to determine which automatic responses to recommend to a user of a receiving device 104 based at least in part on analysis of the message data sent to the receiving device 104. Using the example above, when the message data is related to a photograph of two people playing baseball, the recommendation component 130 may be configured to determine which automatic responses are related to baseball and/or sports and/or the users at issue and/or photographs, etc. These automatic responses that are related to the content of the message data may be prioritized for recommending to the user. Additionally, the output configuration of the device 102 that sent the message data may be utilized by the recommendation component 130 to determine which automatic responses should be recommended to the user. For example, even when the receiving device 104 is a device without a screen, if the sending device 102 includes a screen and/or if the message data included message types associated with displaying information, such as message types having image data, the recommendation component 130 may recommend an automatic response that is image-based.

Once an image is captured that is to be converted to a personalized emoji, as described herein, the system may perform one or more operations to generate data representing the personalized emojis. For example, the image data may be saved, such as to a user registry and/or database of emojis and then the image data may be associated with a keyboard application and/or function to be used when typing messages and/or content. By way of example, data may be generated that associates the image data to functionality of a user interface such that when a user provides user input via the user interface requesting use of the personalized emoji, the system retrieves the image data an utilizes the image data as a personalized emoji, such as in a message.

Additionally, to implement the use of the image data as a personalized emoji, a character encoding standard, such as the American Standard Code for Information Interchange (ASCII), may be utilized. The character encoding may include representing text in computing devices. A control code chart may be utilized as part of the character encoding. In examples, a predefined number of specified characters are encoded into a given number of integers. The At least a portion of the encoded characters may be printable and/or otherwise viewable, and for these encoded characters at least a portion of them may be associated with the personalized emojis as described herein. For example, a ASCII code may be assigned to a personal emoji, and/or may replace one or more standard or otherwise preexisting emojis. For example, if a preexisting emoji is a "smiley face" emoji, the ASCII code assigned to that smiley face emoji may be instead associated with image data representing a user smiling.

Additionally, as opposed to the selection of a photograph to be utilized as a personalized emoji, the image analysis techniques described herein may be utilized to determine which of several images is best suited to represent a personalized emoji. The techniques may also include the modification of the image, such as image resizing, redaction, background modification, etc. such that the resulting personalized emoji focuses on the facial expression of the depicted user and corresponds to a character emoji. Additional details on the analysis of image data to determine which image to utilize and how to identify what portions of an image are to be utilized for generation of a personalized emoji are described below.

As shown in FIG. 1, while some or all of the message analysis and response personalization operations described herein may be performed by the system 106, some or all of the functionality may be performed by one or more of the devices 102, 104. As such, the devices 102, 104 may include a message analyzer 140, a tagging component 142, a recommendation component 144, and/or a personalization component 146. These components may perform the same or similar functionality of their system 106 counterparts as described herein.

It should be noted that while text data is described as a type of data utilized to communicate between various components of the system 106 and/or other systems and/or devices, the components of the system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102, 104.

As shown in FIG. 1, several of the components of the system 106 and the associated functionality of those components as described herein may be performed by one or more of the devices 102, 104. Additionally, or alternatively, some or all of the components and/or functionalities associated with the devices 102, 104 may be performed by the system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 106 may possess its own local memory, which also may store program components, program data, and/or one or more operating systems.

The memory 112 and/or the memory described with respect to the components of the system 106 may include volatile and nonvolatile memory, removable and non-removable media implemented in any method or technology for storage of information, such as computer-readable instructions, data structures, program component, or other data. Such memory 112 and/or the memory described with respect to the components of the system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the system 106 may be implemented as computer-readable storage media ("CRSM"), which may be any available physical media accessible by the processor(s) 108 and/or the processor(s) described with respect to the system 106 to execute instructions stored on the memory 112 and/or the memory described with respect to the components of the system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 110 and/or the network interface(s) described with respect to the components of the system 106 may enable messages between the components and/or devices shown in system 100 and/or with one or more other polling systems, as well as other networked devices. Such network interface(s) 110 and/or the network interface(s) described with respect to the components of the system 106 may include one or more network interface controllers (NICs) or other types of transceiver devices to send and receive messages over the network 108.

For instance, each of the network interface(s) 110 and/or the network interface(s) described with respect to the components of the system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the system 106 may include a wide area network (WAN) component to enable message over a wide area network.

In some instances, the system 106 may be local to an environment associated the devices 102, 104. For instance, the system 106 may be located within one or more of the devices 102, 104. In some instances, some or all of the functionality of the system 106 may be performed by one or more of the devices 102, 104. Also, while various components of the system 106 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
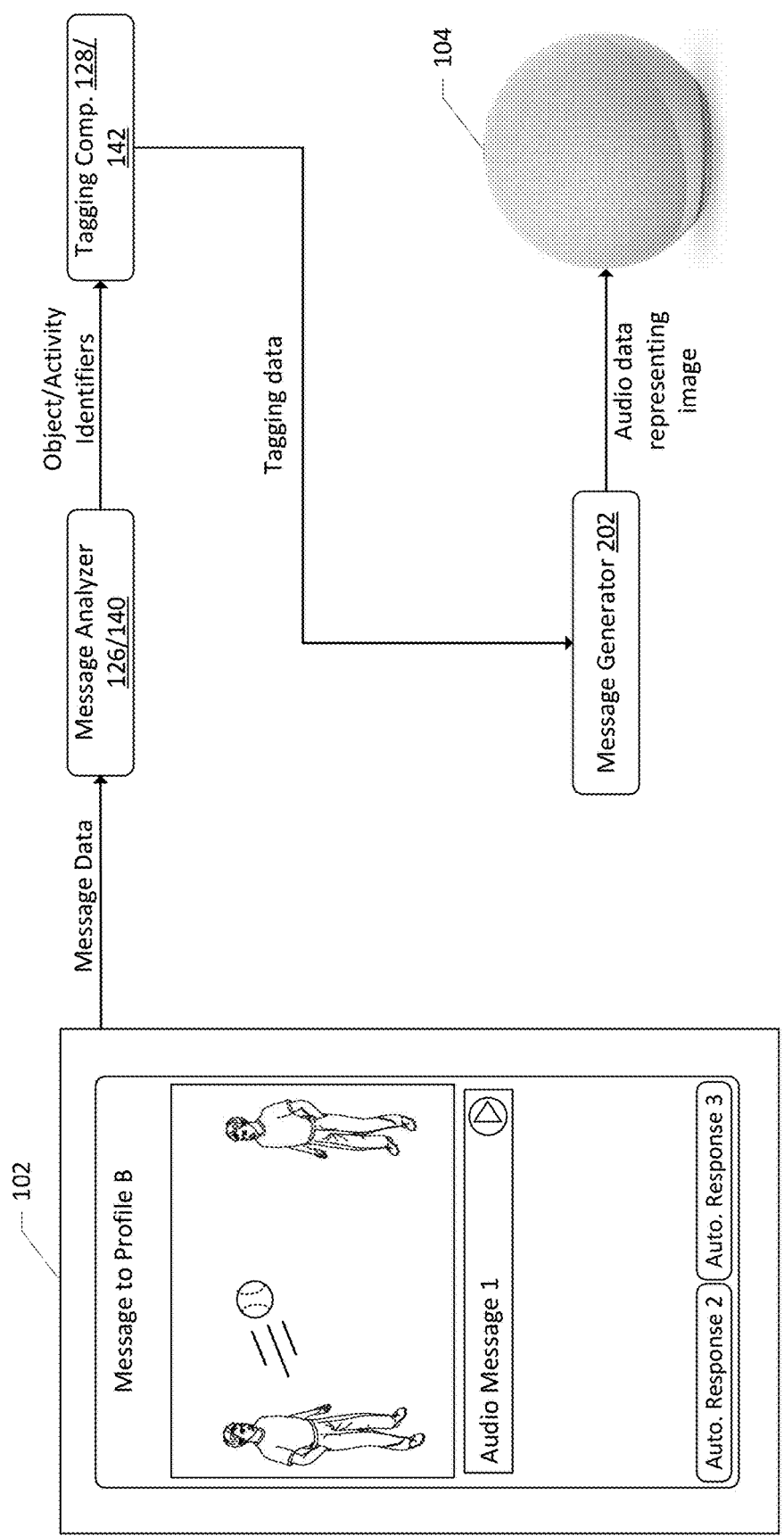
FIG. 2 illustrates a conceptual diagram of example devices and components utilized for converting an image-based message to an audio-based message.

FIG. 2 illustrates a conceptual diagram of example devices and components utilized for converting an image-based message to an audio-based message. As shown in FIG. 2, the devices and components may include some of the same or similar devices and/or components as described with respect to FIG. 1. For example, FIG. 2 may include a sending device 102, a message analyzer 126/140, a tagging component 128/142, a message generator 202, and/or a receiving device 104. FIG. 2 also shows the progression of data from the sending device 102 to various components of a system 106 and ultimately to a receiving device 104.

For example, the message analyzer 126/140 may receive message data from the sending device 102 and an indication of what message types are supported for output by the recipient device 104. By way of example, the message data may include image data corresponding to an image and the indication of the message type supported for output by the recipient device 104 may be audio-type messages, such as in scenarios where the recipient device 104 does not include a screen. In these examples, the message analyzer 126/140 may determine that the image data from the message is to be converted into audio data representing an audible description of objects and/or activities depicted in the image data. The message analyzer 136 may also be configured to analyze the message data to determine attributes of the message data to be utilized for converting the message data into a message type supported by the recipient device 104. For example, the message analyzer 126/140 may, when the message data includes image data, analyze the image data to determine what objects are depicted in the image data and/or what activities are depicted in the image data. By way of example, a given message may include a photograph of two users with one user throwing a baseball to another user. The message analyzer 126/140 may analyze the image data to determine that the image depicts two users, and in examples the identities of the users, a baseball, and positioning of the users with respect to each other and the baseball. To make these determinations, the message analyzer may utilize computer vision techniques, as described more fully herein.

In addition to the computer vision techniques utilized to analyze image data, other forms of data analysis may be performed. For example, in instances where the message data also includes text data and/or audio data representing an annotation and/or a comment associated with the image data, the text data and/or audio data may be utilized to determine what is depicted in the image. For example, the sending user may, in addition to sending the photograph of two users playing baseball, send a text message and/or an audio clip commenting on the photograph, such as "look at that throw!" When the comment is audio data, automatic speech recognition techniques may be utilized to generate text data representing the user comment. The text data may be analyzed to further assist in identifying objects and/or activities depicted in the image. For example, the comment of "look at that throw!" may result in detection of the word "throw" from the comment. The output of the image analysis may have identified user motion from the image data and/or an arm moving, and the output from the text analysis may be utilized by the message analyzer to refine the output to "throwing" and/or "throw a baseball." In still other examples, the results of the text analysis may result in increasing and/or decreasing a confidence value at which objects and/or activities were detected from the image data analysis.

In addition to the above, analysis of the message category associated with the message may be performed by the message analyzer 126/140. For example, a given message may be associated with a given message category or otherwise a content domain. Example message categories may be photographs, recipes, Internet websites links, location markers, etc. The message analyzer 126/140 may receive data indicating the message category for a given message and may utilize the message category to inform detection of objects and/or activities associated with the message data. For example, when a message is associated with a photograph message type, output from the message analysis may include "photograph," "photograph from User C," etc. When a message is associated with a recipe message type, output from the message analysis may include "recipe," "Cookbook A," etc.

Data indicating the results from the message analyzer 126/140, such as object and/or activity identifiers, may be sent to the tagging component 128/142, which may be configured to generate tagging data indicating the identified objects from the image data as well as identifiers of potential activities in which one or more of the objects are engaged in. Using the example above, the tagging component 138 may generate tag data indicating that the image data depicts "User A," "User B," "baseball," "throwing," "baseball mitt," "baseball hat," "arm moving," etc. The tagging data may also indicate the message type of the message, such as "photograph," "recipe," etc.

The message generator 202 may be configured to receive the tagging data and utilizing the tagging data to generate a representation of the message that is supported for output by the receiving device 104. Using the example above, the message generator 202 may receive the tagging data associated with the objects and/or activities depicted in an image and may utilize the tagging data to generate audio data representing an audible description of the objects and/or activities. To do so, the message generator 202 may utilize natural language understanding techniques, described more fully below, to generate text data representing one or more sentences describing the image. Using the example above where the output from the tagging component 128/142 may be "User A," "User B," "baseball," "throwing," "baseball mitt," "baseball hat," etc., the message generator 202 may generate text data representing these objects/activities, such as "photograph of User A throwing a baseball to User B." The TTS component may be utilized to generate audio data from the text data output by the message generator 202. Additional details on text-to-speech techniques are provided elsewhere herein. Thereafter the audio data representing the audible description of the image may be sent to the recipient device 104 for output by a speaker of the recipient device 104.

Figure 3:
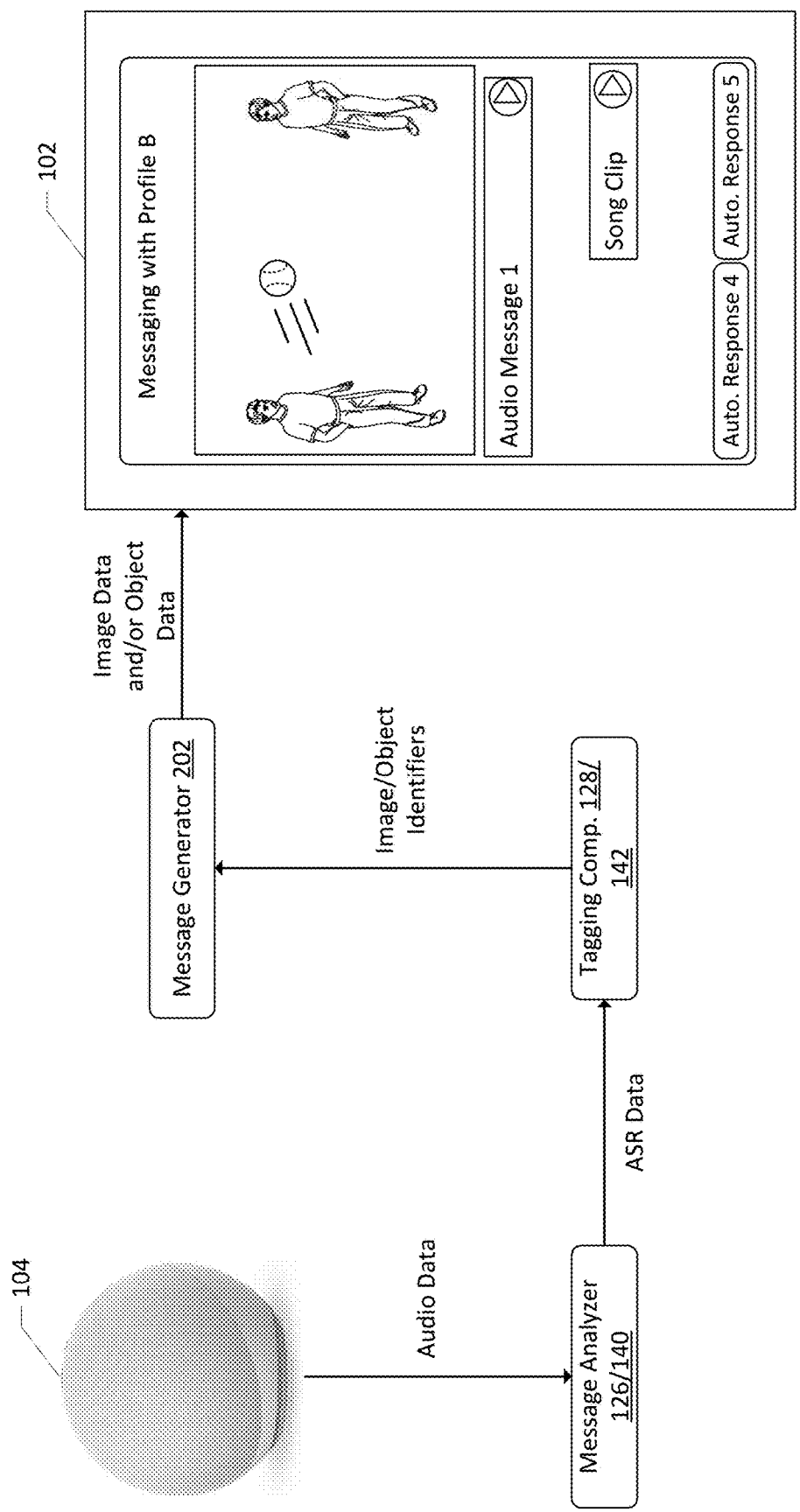
FIG. 3 illustrates a conceptual diagram of example devices and components utilized for converting an audio-based message to an image-based message.

FIG. 3 illustrates a conceptual diagram of example devices and components utilized for converting an audio-based message to an image-based message. As shown in FIG. 3, the devices and components may include some of the same or similar devices and/or components as described with respect to FIG. 1. For example, FIG. 3 may include a sending device 102, a message analyzer 126/140, a tagging component 128/142, a message generator 202, and/or a receiving device 104. FIG. 3 also shows the progression of data from the device 104 to various components of a system 106 and ultimately to device 102. In this example, device 104 is the sending device of audio data representing a responsive message to message data received by the device 102.

FIG. 3 illustrates a process for message modality conversion from an audio-based message to at least partially an image-based message. For example, audio data representing a message may be received from the device 104. The message analyzer 126/140 may analyze the audio data and/or by generate corresponding text data as a textual representation of the audio data, such as in situations where the output capabilities of the device 102 indicate that the device 102 includes a screen.

The tagging component 128/142 may receive ASR data from the message analyzer 126/140 and may generate tagging data indicating component of the ASR data that are indicative of the message from the device 104 to the device 102. For example, the audio data may be "send an audio clip of 'take me out to the ballgame'." The tagging component 128/142 may generate tagging data indicating a "send audio clip" intent as well as an identifier of the audio clip to be send. To do so, the tagging component 128/142 may utilize natural language understanding processing to determine the intent. This tagging data may then be sent to the message generator 202 for generating the message to be sent to the device 102.

In the example provided in FIG. 3, the message generator 202 may receive the tagging data from the tagging component 128/142 and may query a database of audio clips for an audio clip corresponding to the identifier of "take me out to the ballgame." The message generator 202 may also generate message data such as a visual indicator of the audio clip and an association between the visual indicator and a resource locator for the audio data representing the audio clip. This message data may be sent to the device 102 for display on a screen of the device. As shown in FIG. 3, a visual indicator stating "song clip" is provided on the screen of the device 102 along with an icon that, when selected, may cause audio associated with the audio clip to be output by a speaker of the device 102. By so doing, even though the message provided by the user of device 104 was in the form of audio data, that audio-based message is converted to an image-based message for presentation to the user of device 102.

Figure 4:
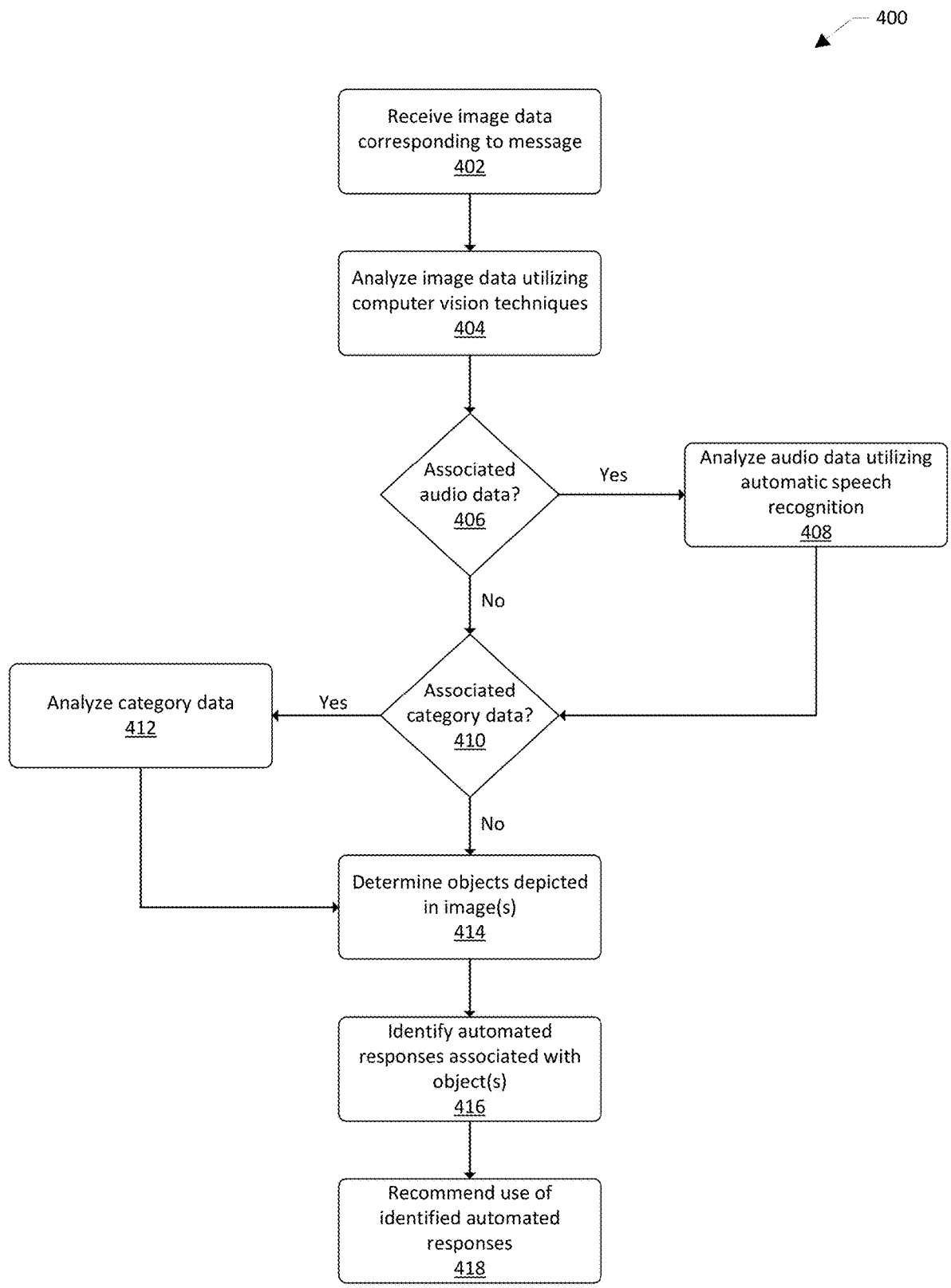
FIG. 4 illustrates a flow diagram of an example process for automatic response recommendation utilizing image-based analysis, audio-based analysis, and analysis of message type.

FIG. 4 illustrates processes for using message data analysis for message modality conversion and response recommendations. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3 and 5-10, although the processes may be implemented in a wide variety of other environments, architectures and systems.

FIG. 4 illustrates a flow diagram of an example process 400 for automatic response recommendation utilizing image-based analysis, audio-based analysis, and analysis of message type. The order in which the operations or steps are described is not intended to be construed as a limitation, and any number of the described operations may be combined in any order and/or in parallel to implement process 400.

At block 402, the process 400 may include receiving image data corresponding to a message. For example, a messaging component of a system configured to facilitate the sending of messages between devices may receive message data from a sending device that is directed to a recipient device. The messaging component may be configured to utilize an identifier of the recipient device and/or account data associated with the recipient device to determine the supported capabilities of the recipient device. For example, a user registry may be queried to determine, for the recipient device at issue, whether the recipient device includes a screen for displaying images and/or includes a speaker for outputting audio. The messaging component may also be configured to determine a message type of the message data. For example, the messaging component may be configured to determine when message data includes image data and/or audio data and/or text data. When the messaging component determines that a message type of the message data is not supported for output by the recipient device, the message component may query a message analyzer for generating a representation of the message that is supported for output on the recipient device.

At block 404, the process 400 may include analyzing the image data utilizing computer vision techniques. For example, the message analyzer may receive the message data and an indication of what message types are supported for output by the recipient device. By way of example, the message data may include image data corresponding to an image and the indication of the message type supported for output by the recipient device may be audio-type messages, such as in scenarios where the recipient device does not include a screen. In these examples, the message analyzer may determine that the image data from the message is to be converted into audio data representing an audible description of objects and/or activities depicted in the image data. The message analyzer may also be configured to analyze the message data to determine attributes of the message data to be utilized for converting the message data into a message type supported by the recipient device. For example, the message analyzer may, when the message data includes image data, analyze the image data to determine what objects are depicted in the image data and/or what activities are depicted in the image data. By way of example, a given message may include a photograph of two users with one user throwing a baseball to another user. The message analyzer may analyze the image data to determine that the image depicts two users, and in examples the identities of the users, a baseball, and positioning of the users with respect to each other and the baseball. To make these determinations, the message analyzer may utilize computer vision techniques, which are described in more detail below.

When image data is described herein as being analyzed, that analysis may include the use of computer vision to identify objects depicted in the image data. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: Lines, edges, and ridges; Localized interest points such as corners, blobs, or points; More complex features may be related to texture, shape, or motion. At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classifying a detected object into different categories; and comparing and combining two different views of the same object. Making the final decision required for the application, for example match/no-match in recognition applications, may then be performed.

At block 406, the process 400 may include determining whether there is audio data associated with the message. For example, in some instances the user that sent the image data may also send an annotation and/or comment associated with the image data. The annotation and/or comment may be in the form of speech input provided by the user. In these instances, the message will be associated with audio data representing the speech input, along with the image data.

In examples where the message has associated audio data, the process 400 may include, at block 408, analyzing the audio data utilizing automatic speech recognition. For example, in instances where the message data also includes text data and/or audio data representing an annotation and/or a comment associated with the image data, the text data and/or audio data may be utilized to determine what is depicted in the image. For example, the sending user may, in addition to sending the photograph of two users playing baseball, send a text message and/or an audio clip commenting on the photograph, such as "look at that throw!" When the comment is audio data, automatic speech recognition techniques may be utilized to generate text data representing the user comment. The text data may be analyzed to further assist in identifying objects and/or activities depicted in the image. For example, the comment of "look at that throw!" may result in detection of the word "throw" from the comment. The output of the image analysis may have identified user motion from the image data and/or an arm moving, and the output from the text analysis may be utilized by the message analyzer to refine the output to "throwing" and/or "throw a baseball." In still other examples, the results of the text analysis may result in increasing and/or decreasing a confidence value at which objects and/or activities were detected from the image data analysis.

In examples where the message does not have associated audio data, and/or after analyzing the audio data at block 408, the process 400 may include, at block 410, determining whether there is category data associated with the message. For example, when sending the message data one or more applications associated with the user's device may be utilized, such as a camera roll, a map application, a social media application, a recipe application, etc. When the message includes data shared from the given application, the application may provide an indication of the message category associated with the message. In other examples, metadata associated with the message itself may be utilized to determine the message category.

In examples where the message has associated category data, the process 400 may include, at block 412, analyzing the category data to determine a message category associated with the message. For example, a given message may be associated with a given message category or otherwise a content domain. Example message categories may be photographs, recipes, Internet websites links, location markers, etc. The message analyzer may receive data indicating the message category for a given message and may utilize the message category to inform detection of objects and/or activities associated with the message data. For example, when a message is associated with a photograph message type, output from the message analysis may include "photograph," "photograph from User C," etc. When a message is associated with a recipe message type, output from the message analysis may include "recipe," "Cookbook A," etc.

In examples where the message does not have associated category data, and/or after analyzing the category data at block 412, the process 400 may include, at block 414, determining one or more objects depicted in the image(s). For example, data indicating the results from the message analyzer may be sent to a tagging component, which may be configured to generate tagging data indicating the identified objects from the image data as well as identifiers of potential activities in which one or more of the objects are engaged in. Using the example above, the tagging component may generate tag data indicating that the image data depicts "User A," "User B," "baseball," "throwing," "baseball mitt,"

"baseball hat," "arm moving," etc. The tagging data may also indicate the message type of the message, such as "photograph," "recipe," etc.

At block 416, the process 400 may include identifying automated responses associated with the one or more objects. For example, when a message is received at a device, one or more automatic responses may be presented to a user as options for responding to the message. In a text message example, a text message may be received at a device and one or more automatic responses may be suggested, such as "thank you," "yes," "no," "sounds good." A user of the device may select one or more of the automatic responses and the response may be sent without the user needing to type the response and press send. As disclosed herein, a recommendation component may be utilized to determine which automatic responses to recommend to a user of a receiving device based at least in part on analysis of the message data sent to the receiving device. Using the example above, when the message data is related to a photograph of two people playing baseball, the recommendation component may be configured to determine which automatic responses are related to baseball and/or sports and/or the users at issue and/or photographs, etc. These automatic responses that are related to the content of the message data may be prioritized for recommending to the user. Additionally, the output configuration of the device that sent the message data may be utilized by the recommendation component to determine which automatic responses should be recommended to the user. For example, even when the receiving device is a device without a screen, if the sending device includes a screen and/or if the message data included message types associated with displaying information, such as message types having image data, the recommendation component may recommend an automatic response that is image-based.

At block 418, the process 400 may include recommending use of the identified automated responses, such as to respond to the message. For example, data may be sent to the device in question that causes the device to output the recommended automatic responses and provide an input mechanism for receiving user input data for accepting and/or rejecting the automatic response recommendations.

Figure 5:
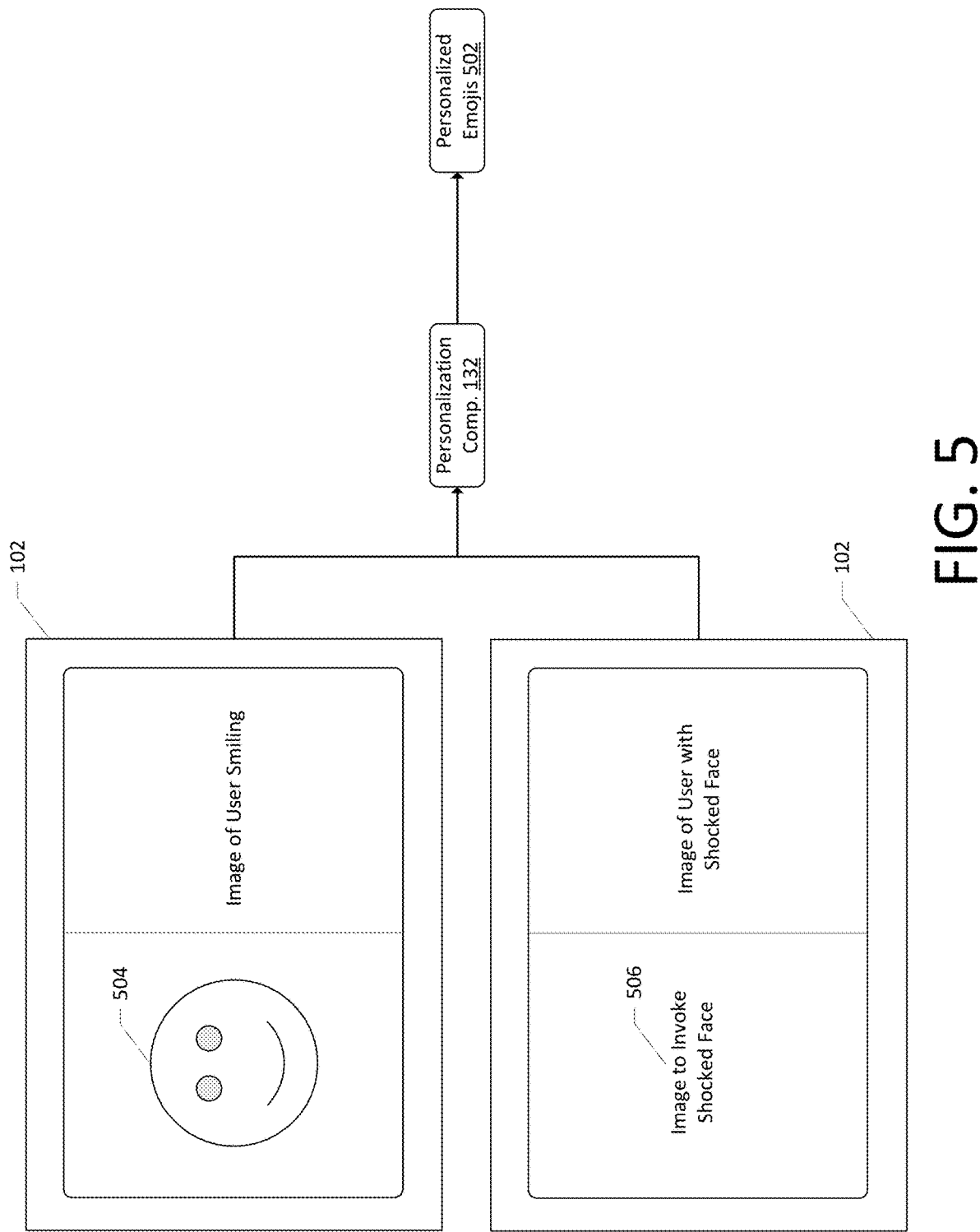
FIG. 5 illustrates a conceptual diagram of example devices and components utilized for generating personalized emojis using prompted displays.

FIG. 5 illustrates a conceptual diagram of example devices and components utilized for generating personalized emojis using prompted displays. FIG. 5 may include some of the same devices and/or components described with respect to FIG. 1. For example, FIG. 5 may include a device 102 and a personalization component 132. FIG. 5 illustrates the use of a device 102 for capturing images of a user to generate personalized emojis or otherwise images of the user making certain facial expressions for use as an automatic response to received message data.

At least a portion of the personalized automatic responses described herein may include personalized emojis 502 or otherwise images of a user performing various facial expressions such as smiling, frowning, looking surprised, looking sad, looking excited, etc. To facilitate the generation of these personalized emojis, one or more techniques to capture images of the user with various facial expressions may be utilized.

In one example illustrated in FIG. 5, a user interface of a device 102 operated by the user may be caused to display commands for the user to perform to capture the images of the user. For example, a reference emoji 504 such as a smiley-face emoji may be displayed by the user interface with a command for the user to mimic the smiley face. In instances where the device includes a camera, the camera may be utilized to capture an image of the user while mimicking the smiley-face emoji. This process may be repeated for other facial expressions. In another example, the user interface may display a photograph 506 that is selected to elicit a given facial expression. For example, a first photograph may elicit a given facial expression, while another photograph may elicit another facial expression. Again, a camera of the device may capture images depicting the user with the various facial expressions, such as smiling, frowning, looking surprised, looking sad, looking excited, etc. To facilitate the generation of these personalized emojis, one or more techniques to capture images of the user with various facial expressions may be utilized. In one example, a user interface of a device operated by the user may be caused to display commands for the user to perform to capture the images of the user. For example, a reference emoji such as a smiley-face emoji may be displayed by the user interface with a command for the user to mimic the smiley face. In instances where the device includes a camera, the camera may be utilized to capture an image of the user while mimicking the smiley-face emoji. This process may be repeated for other facial expressions. In another example, the user interface may display a photograph that is selected to elicit a given facial expression. For example, a first photograph of something funny may elicit a given facial expression, while another photograph of something sad may elicit another facial expression. Again, a camera of the device may capture images depicting the user with the various facial expressions.

In these examples, image analysis techniques, such as computer vision techniques, may be utilized to determine when to capture an image of the user having a given facial expression. In other examples, a buffer of captured images may be maintained by the device, and the corresponding image data may be analyzed to determine which image(s) are most likely to depict the user with the given facial expression. In these and other examples, the selected images may be displayed for the user to review and select which of the images are to be utilized as personalized emojis.

Image data representing the images captured of the user may be sent to the personalization component 132, which may store the image data in a library of personalized emojis 502 along with, in examples, an indicator of the expression associated with a given personalized emoji 502.

Figure 6:
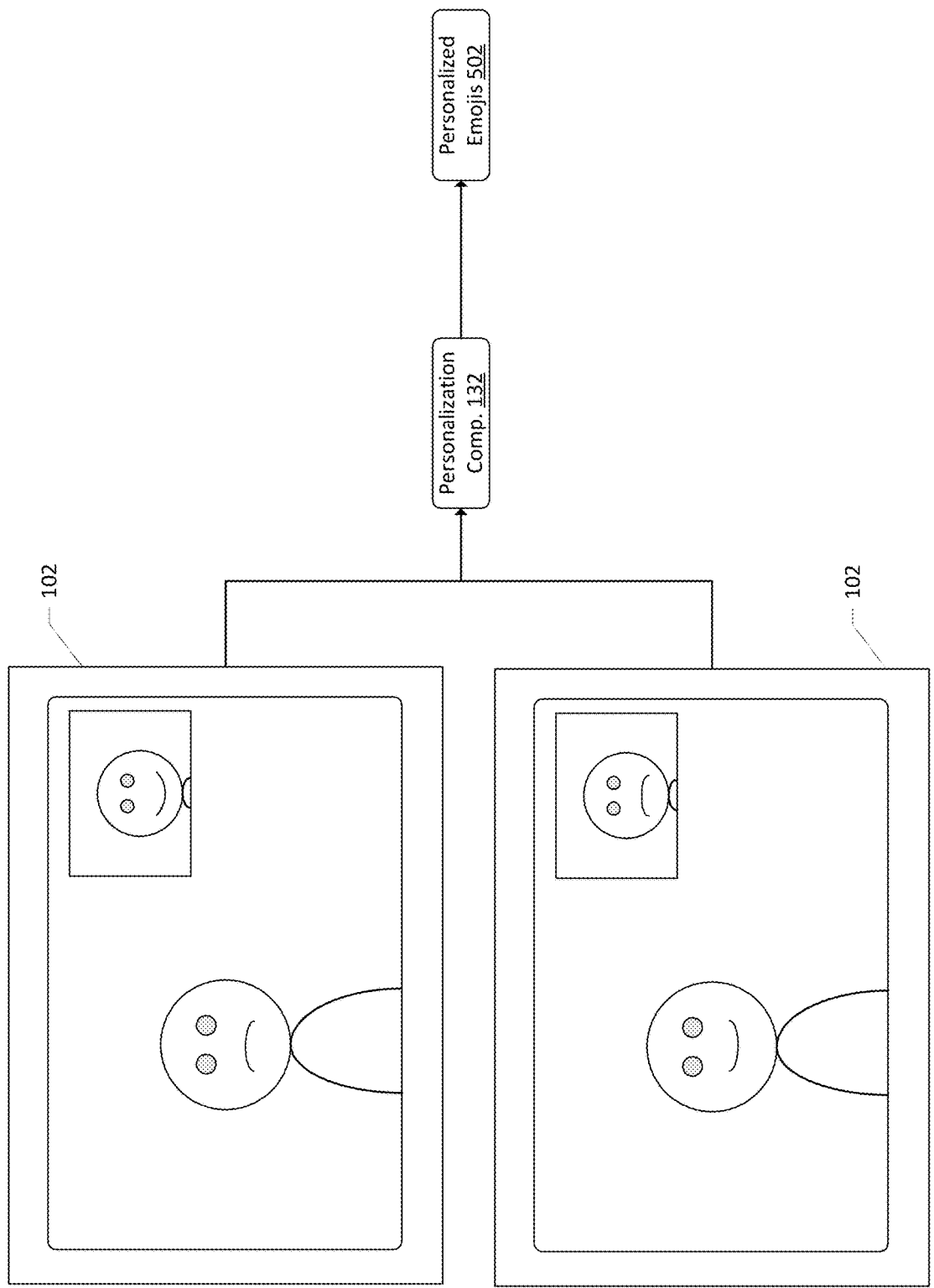
FIG. 6 illustrates a conceptual diagram of example devices and components utilized for generating personalized emoji from video captures.

FIG. 6 illustrates a conceptual diagram of example devices and components utilized for generating personalized emojis from video captures. FIG. 6 may include some of the same devices and/or components described with respect to FIG. 1. For example, FIG. 6 may include a device 102 and a personalization component 132. FIG. 6 illustrates the use of a device 102 for capturing images of a user to generate personalized emojis or otherwise images of the user making certain facial expressions for use as an automatic response to received message data.

At least a portion of the personalized automatic responses described herein may include personalized emojis 502 or otherwise images of a user performing various facial expressions such as smiling, frowning, looking surprised, looking sad, looking excited, etc. To facilitate the generation of these personalized emojis, one or more techniques to capture images of the user with various facial expressions may be utilized.

In the example of FIG. 6, automatic capture of images may be performed during a video call that includes the user. For example, the user may provide consent and/or a request for images to be captured during a video call and/or otherwise when video of the user is being captured. The personalization component 132 may be configured to continuously capture frames of the video data and to determine if the given frames depict a user reaction that may be converted to a personalized emoji 502. For example, data associated with the video may be analyzed to determine whether voice amplitude changes have occurred, whether there is motion of the user over a given number of frames, whether portions of the user's face are moving indicating the start or end of a facial expression, whether keywords are spoken by the user, detection of certain acoustic events such as clapping, laughing, etc. These signals may be utilized as a trigger event for flagging given frames of the video as potential personalized emojis. The flagged frames may be presented to the user for review and selection for inclusion in a library of personalized emojis 502, along with, in examples, display of the expression determined by the personalization component 144 to be associated with the frame(s). The user may select some or all of the frames and image data corresponding to the frames may be saved in a personalized emoji library. Thereafter, the personalized emojis 502 may be utilized as automatic responses to message data and may be recommended for use as described herein.

When motion in the video is utilized as a trigger event for capturing and/or selecting images as potential personalized emojis, computer vision techniques may be utilized to determine when facial features and/or movement of facial features of a user indicates that the user has a facial expression predetermined to be desirable for generating a personalized emoji. For example, the computer vision techniques may be utilized to determine that a mouth portion of the user depicted in an image is in the position of a smile, a frown, an open mouth, etc. Additional features of the user's face may also be analyzed, such as the raising and/or lowering of eyebrows, the widening and/or squinting of eyes, the raising and/or lowering of a cheek portion of the face, movement of hands, etc. Some or all of this analysis may be utilized to determine that the features of the user as depicted in the image indicate that a predetermined facial expression has been captured for generation of personalized emojis.

When audio data is utilized to determine if the trigger event has occurred, characteristics of the audio data may be analyzed to determine if audio associated with the video indicates that a portion of the video is associated with the user making a given facial expression. For example, an amplitude of the audio data may be analyzed to determine when variations in amplitude occur. For example, during a video call, an amplitude of the audio data may, during a first period of time, be relatively constant. This may occur when two users are talking in a normal tone and at a normal volume. However, at some point during the call the amplitude associated with one or both of the users' voices may increase, such as above a threshold amount. In these instances, the amplitude change may indicate that something important in the conversation has occurred and/or that one or more of the users is laughing or otherwise producing sound that is louder than a normal conversation. These portions of the video call may be flagged for capture of images and/or for saving the corresponding image data as potential personalized emojis. The audio data analysis may also include the use of automatic speech recognition to determine whether one or more words spoken by one or more of the users indicates that the user(s) are producing given facial expressions. For example, when one of the users says "wow, that is great," such a phrase may indicate that one or more of the users is likely smiling and/or producing facial expressions indicating surprise and/or excitement. Again, these portions of the video call may be flagged for capture of images and/or for saving the corresponding image data as potential personalized emojis.

Figure 7:
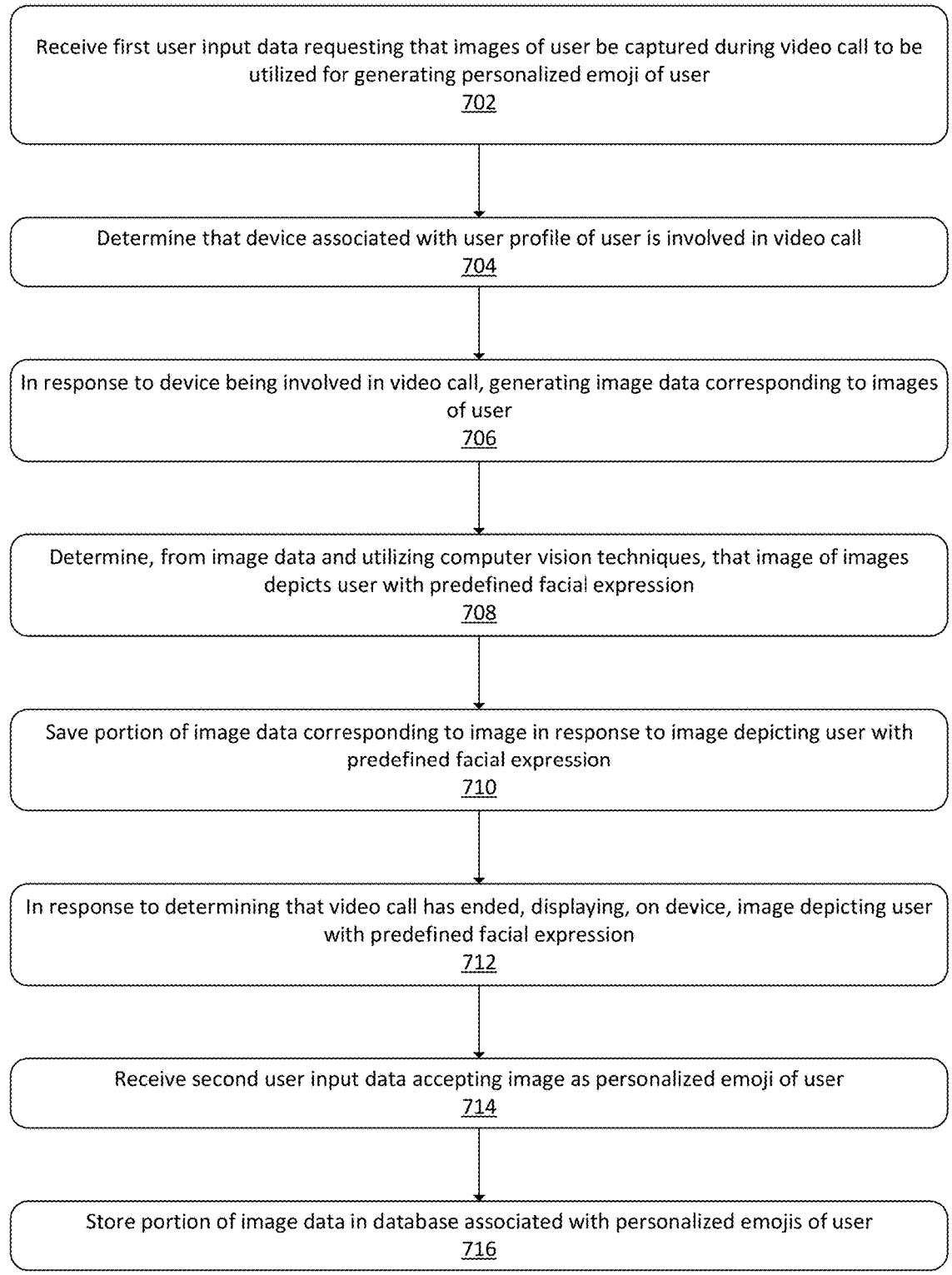
FIG. 7 illustrates a flow diagram of an example process for message data analysis for response recommendations.
Figure 8:
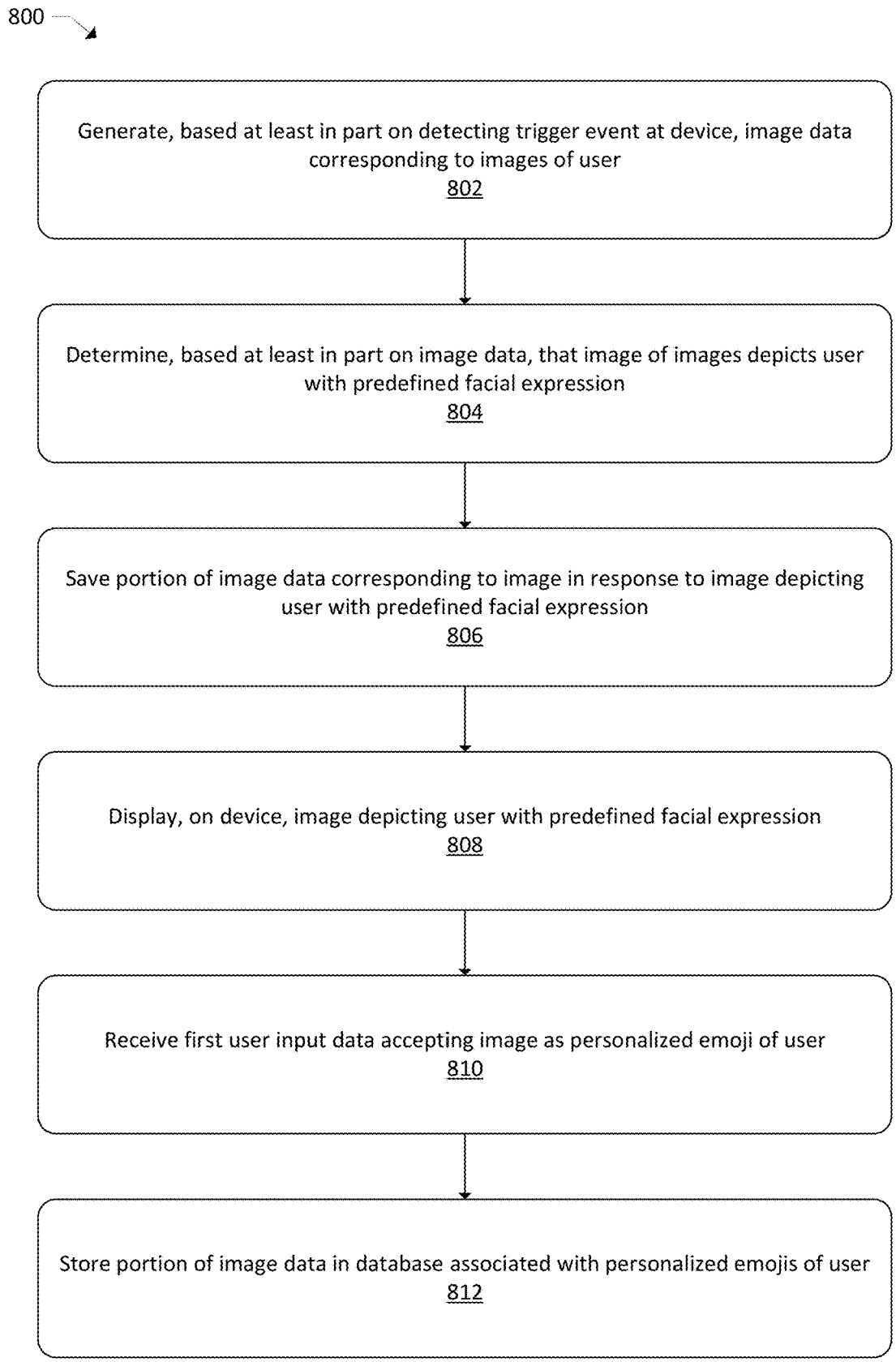
FIG. 8 illustrates a flow diagram of another example process for message data analysis for response recommendations.

FIGS. 7 and 8 illustrates processes for using message data analysis for message modality conversion and response recommendations. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6, 9, and 10, although the processes may be implemented in a wide variety of other environments, architectures and systems.

FIG. 7 illustrates a flow diagram of an example process 700 for using message data analysis for message modality conversion and response recommendations. The order in which the operations or steps are described is not intended to be construed as a limitation, and any number of the described operations may be combined in any order and/or in parallel to implement process 700.

At block 702, the process 700 may include receiving first user input data requesting that images of a user be captured during a video call to be utilized for generating a personalized emoji of the user. For example, a user may provide user input, such as to an application on the user's device requesting that images of the user be captured for generating a personalized emoji of the user.

At block 704, the process 700 may include determining that a device associated with a user profile of the user is involved in the video call. For example, when an application utilized for video calls and/or for otherwise capturing video from a camera associated with the device is in use, the determination may be made that the device is involved in the video call.

At block 706, the process 700 may include, in response to the device being involved in the video call, generating image data corresponding to the images of the user. For example, a camera associated with the device may be configured to capture images of a field of view of the camera, which may include the user. Image data corresponding to the captured images may be generated. As used herein, when image data is described, that image data may correspond to a single image and/or a series of images, such as in the context of a video.

At block 708, the process 700 may include determining, from the image data and utilizing computer vision techniques, that an image of the images depicts the user with a predefined facial expression. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)— Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: Lines, edges, and ridges; Localized interest points such as corners, blobs, or points; More complex features may be related to texture, shape, or motion. At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classifying a detected object into different categories; and comparing and combining two different views of the same object. Making the final decision required for the application, for example match/no-match in recognition applications, may then be performed.

At block 710, the process 700 may include saving a portion of the image data corresponding to the image in response to the image depicting the user with the predefined facial expression. For example, a buffer of images may be maintained for the images captured during the video call. When one or more of the images in the buffer is determined to likely include a facial expression of a user for generating a personalized emoji, that image and/or the images in the buffer may be saved. If not, the images may be discarded from the buffer.

At block 712, the process 700 may include, in response to determining that the video call has ended, displaying, on the device, the image depicting the user with the predefined facial expression. For example, the images may be displayed along with functionality for the user to select which of the displayed images are to be personalized emojis.

At block 714, the process 700 may include receiving second user input data accepting the image as the personalized emoji of the user. For example, the second user input may indicate a selection of one or more of the displayed images, as well as information indicating the emotion and/or facial expression associated with the image(s).

At block 716, the process 700 may include storing the portion of the image data in a database associated with personalized emojis of the user. For example, the database may include the personalized emojis that were generated as part of the process described above as well as, in examples, previously-generated personalized emojis.

Additionally, or alternatively, the process 700 may include receiving audio data representing words spoken by the user during the video call. The process 700 may also include determining that a volume characteristic of the audio data satisfies a threshold volume characteristic at a time when the image was captured. In these examples, saving the portion of the image data may be in response to the volume characteristic satisfying the threshold volume characteristic.

Additionally, or alternatively, the process 700 may include receiving audio data representing words spoken by the user during the video call. The process 700 may also include determining, from the audio data, text data indicating words spoken by the user during the video call. The process 700 may also include identifying, from the text data, a word predefined to be associated with the predefined facial expression. The process 700 may also include determining that the word was spoken by the user at a time when the image was captured. In these examples, saving the portion of the image data may be in response to identifying the word as spoken by the user when the image was captured.

Additionally, or alternatively, the process 700 may include determining that a device associated with the account data is an image-output device and sending first message data to the device. The process 700 may also include determining, from data indicating the one or more objects depicted in the image, one or more automatic responses predefined to be associated with at least one of the one or more objects. The process 700 may also include generating data representing an indicator of the one or more automatic responses. The process 700 may also include sending the data to the device, the data configured to be utilized by the device to display the indicator of the one or more automatic responses. The process 700 may also include receiving input data representing a selection of the one or more automatic responses. The process 700 may also include sending second message data to the device, the second message data including the one or more automatic responses as selected.

Additionally, or alternatively, the process 700 may include receiving, from a device, audio data representing a user utterance requesting use of an automatic response to first message data, the automatic response including prerecorded audio data. The process 700 may also include generating, in response to the first message data being sent from an image-output device, image data representing an visual indicator of the prerecorded audio data. The process 700 may also include sending second message data to the device, the second message data including the visual indicator of the prerecorded audio data.

Additionally, or alternatively, the process 700 may include determining that the account data includes second image data representing a personal emoji of a user associated with the second device. The process 700 may also include causing output, on a device, of a recommendation to utilize the personal emoji to respond to the first message data. The process 700 may also include receiving input data accepting the recommendation and sending second message data to the device, the second message data configured to be utilized by the first device to display the personal emoji.

FIG. 8 illustrates a flow diagram of another example process 800 for using message data analysis for message modality conversion and response recommendations. The order in which the operations or steps are described is not intended to be construed as a limitation, and any number of the described operations may be combined in any order and/or in parallel to implement process 800.

At block 802, the process 800 may include generating, based at least in part on detecting a trigger event at a device, image data corresponding to images of a user. For example, a camera associated with the device may be configured to capture images of a field of view of the camera, which may include the user. Image data corresponding to the captured images may be generated. In examples, the trigger event may include a user requesting that images be captured during video call and/or otherwise.

At block 804, the process 800 may include determining, based at least in part on the image data, that an image of the images depicts the user with a predefined facial expression. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)— Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: Lines, edges, and ridges; Localized interest points such as corners, blobs, or points; More complex features may be related to texture, shape, or motion. At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classifying a detected object into different categories; and comparing and combining two different views of the same object. Making the final decision required for the application, for example match/no-match in recognition applications, may then be performed.

At block 806, the process 800 may include saving a portion of the image data corresponding to the image in response to the image depicting the user with the predefined facial expression. For example, a buffer of images may be maintained for the images captured during the video call. When one or more of the images in the buffer is determined to likely include a facial expression of a user for generating a personalized emoji, that image and/or the images in the buffer may be saved. If not, the images may be discarded from the buffer.

At block 808, the process 800 may include displaying, on the device, the image depicting the user with the predefined facial expression. For example, the images may be displayed along with functionality for the user to select which of the displayed images are to be personalized emojis.

At block 810, the process 800 may include receiving first user input data accepting the image as a personalized emoji of the user. For example, the user input may indicate a selection of one or more of the displayed images, as well as information indicating the emotion and/or facial expression associated with the image(s).

At block 812, the process 800 may include storing the portion of the image data in a database associated with personalized emojis of the user. For example, the database may include the personalized emojis that were generated as part of the process described above as well as, in examples, previously-generated personalized emojis.

Additionally, or alternatively, the process 800 may include receiving audio data representing words spoken by the user when the images were captured. The process 800 may also include determining that a volume characteristic of the audio data satisfies a threshold volume characteristic at a time when the image was captured. In these examples, saving the portion of the image data may be based at least in part on the volume characteristic satisfying the threshold volume characteristic.

Additionally, or alternatively, the process 800 may include receiving audio data representing words spoken by the user when the images were captured. The process 800 may also include determining, based at least in part on analysis of the audio data, words spoken by the user when the images were captured. The process 800 may also include identifying a word of the words that is associated with the predefined facial expression and determining that the word was spoken by the user at a time when the image was captured. In these examples, saving the portion of the image data may be based at least in part on identifying the word as spoken by the user when the image was captured.

Additionally, or alternatively, the process 800 may include causing output, on the device, of a recommendation to utilize the personalized emoji to respond to first message data received at the device. The process 800 may also include receiving third user input data accepting the recommendation and sending second message data configured to be utilized to display the personalized emoji.

Additionally, or alternatively, the process 800 may include determining that first message data received at the device includes audio data representing an audio message. The process 800 may also include generating, based at least in part on the audio data, text data indicating a textual representation of the audio message. The process 800 may also include determining a subset of the personalized emojis that are associated with the textual representation of the audio message. The process 800 may also include causing output, on the device, of a recommendation to utilize one or more the personalized emojis in the subset of the personalized emojis to respond to the first message data.

Additionally, or alternatively, the process 800 may include determining that first message data received at the device is associated with a message content category of multiple message content categories based at least in part on an application being utilized to send the first message data. The process 800 may also include determining a subset of the personalized emojis that are associated with the message content category. The process 800 may also include causing output, on the device, of a recommendation to utilize one or more the personalized emojis in the subset of the personalized emojis to respond to the first message data.

Additionally, or alternatively, the process 800 may include receiving second user input data requesting generation of the image data, wherein receipt of the second user input data represents the trigger event. The process 800 may also include causing display, on the device and based at least in part on receiving the second user input data, a reference image depicting a facial expression and a request to mimic the facial expression. In these examples, generating the image data may be performed from the images captured while causing display of the reference image.

Additionally, or alternatively, the process 800 may include determining that a video call is associated with the device, the video call representing the trigger event. The process 800 may also include capturing the images while the video call is occurring. In these examples, generating the image data comprises generating the image data from the images captured while the video call is occurring.

Figure 9:
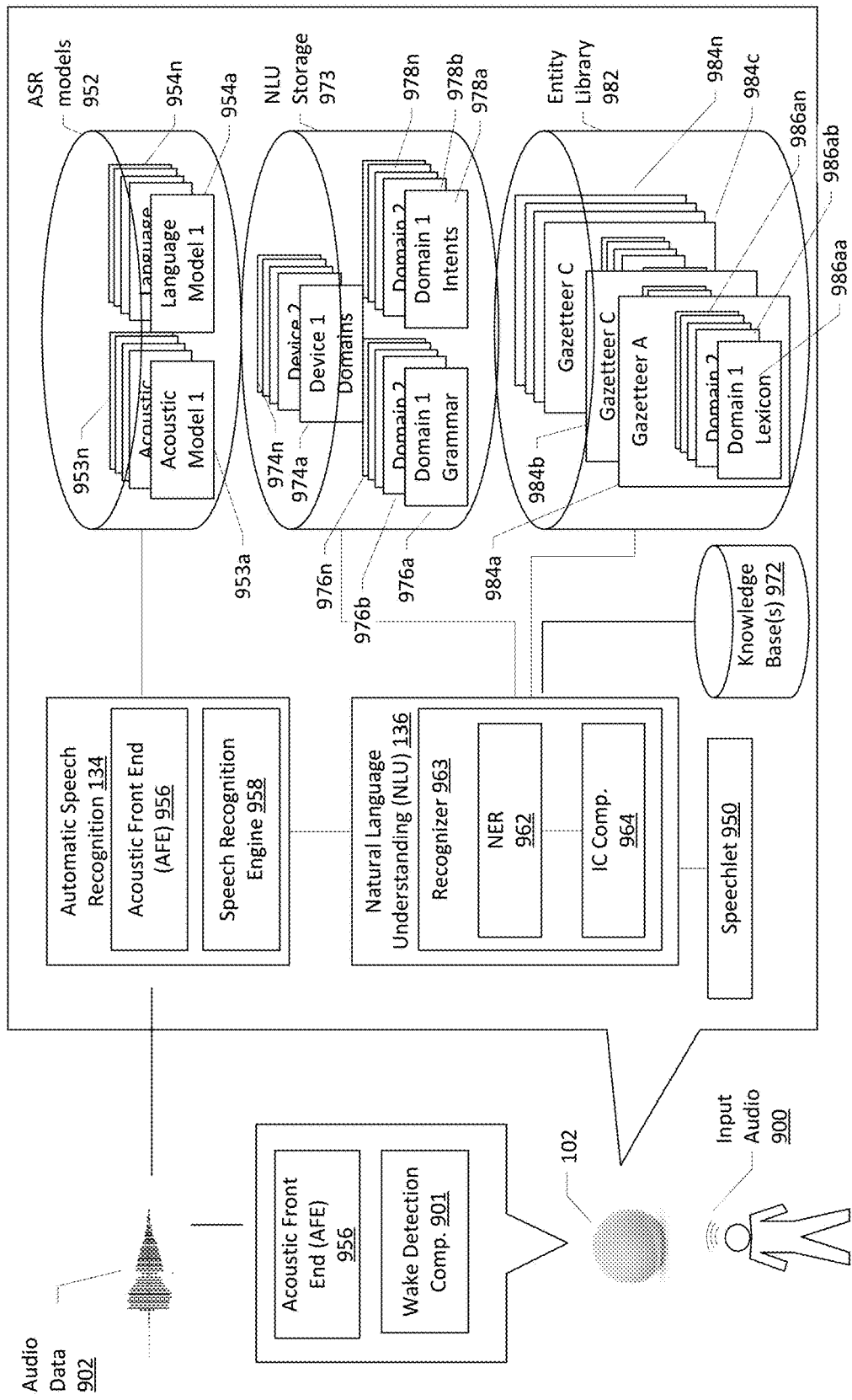
FIG. 9 illustrates a conceptual diagram of components of a speech-processing system for processing audio data provided by one or more devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 9 may occur directly or across a network 108. An audio capture component, such as a microphone 114 of the device 102, 104, or another device, captures audio 900 corresponding to a spoken utterance. The device 102, 104, using a wake word engine 901, then processes audio data corresponding to the audio 900 to determine if a keyword (such as a wakeword) is detected in the audio data. Following detection of a wakeword, the device 102, 104 processes audio data 902 corresponding to the utterance utilizing an ASR component 134. The audio data 902 may be output from an optional acoustic front end (AFE) 956 located on the device prior to transmission. In other instances, the audio data 902 may be in a different form for processing by a remote AFE 956, such as the AFE 956 located with the ASR component 134.

The wake word engine 901 works in conjunction with other components of the user device, for example a microphone to detect keywords in audio 900. For example, the device may convert audio 900 into audio data, and process the audio data with the wake word engine 901 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the device 102, 104 may "wake." The audio data 902 may include data corresponding to the wakeword. Further, a local device may "wake" upon detection of speech/spoken audio above a threshold, as described herein. An ASR component 134 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 138 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956).

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, order ice cream and milk?" The wake detection component may identify the wake word, otherwise described as a trigger expression, "Alexa," in the user utterance and may "wake" based on identifying the wake word. The speech recognition engine 958 may identify, determine, and/or generate text data corresponding to the user utterance, here "order ice cream and milk."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 136 may include various components, including potentially dedicated processor(s), memory, storage, etc. As shown in FIG. 9, an NLU component 136 may include a recognizer 963 that includes a named entity recognition (NER) component 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 134 based on the utterance input audio 900) and attempts to make a semantic interpretation of the text. That is, the NLU process determines the meaning behind the text based on the individual words and then implements that meaning. NLU processing 136 interprets a text string to derive an intent or a desired action from the user as well as the pertinent pieces of information in the text that allow a device (e.g., device 102, 104) to complete that action. For example, if a spoken utterance is processed using ASR 134 and outputs the text "order ice cream and milk" the NLU process may determine that the user intended to order food, with the food being ice cream and milk.

The NLU 136 may process several textual inputs related to the same utterance. For example, if the ASR 134 outputs N text segments (as part of an N-best list), the NLU may process all N outputs to obtain NLU results.

As will be discussed further below, the NLU process may be configured to parse and tag to annotate text as part of NLU processing. For example, for the text "order ice cream and milk," "order" may be tagged as a command (to purchase items) and "ice cream" and "milk" may be tagged as the naming identifiers of the items to be purchased.

To correctly perform NLU processing of speech input, an NLU process 136 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 962 receives a query in the form of ASR results and attempts to identify relevant grammars and lexical information that may be used to construe meaning. To do so, the NLU component 136 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 964 parses the query to determine an intent or intents for each identified domain, where the intent corresponds to the action to be performed that is responsive to the query. Each domain is associated with a database (978a-978n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 964 identifies potential intents for each identified domain by comparing words in the query to the words and phrases in the intents database 978. In some instances, the determination of an intent by the IC component 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC component 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (976) framework or frameworks may correspond to sentence structures such as "purchase item called 'Item A' from Marketplace A."

For example, the NER component 962 may parse the query to identify words as subject, object, verb, preposition, etc., based on grammar rules and/or models, prior to recognizing named entities. The identified verb may be used by the IC component 964 to identify intent, which is then used by the NER component 962 to identify frameworks. A framework for the intent of "play a song," meanwhile, may specify a list of slots/fields applicable to play the identified "song" and any object modifier (e.g., specifying a music collection from which the song should be accessed) or the like. The NER component 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 962 may search the database of generic words associated with the domain (in the knowledge base 972). So, for instance, if the query was "identify this song," after failing to determine which song is currently being output, the NER component 962 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 950. The destination speechlet 950 may be determined based on the NLU output. For example, if the NLU output includes a command to send a message, the destination speechlet 950 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 950 may provide some or all of this information to a text-to-speech (TTS) engine. The TTS engine may then generate an actual audio file for outputting the audio data determined by the application (e.g., "okay," or "items ordered").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 136 during runtime operations where NLU operations are performed on text (such as text output from an ASR component 134). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC component 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, device 102, 104 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 106, as illustrated herein are exemplary, and may be located in a stand-alone device or may be included, in whole or in part, as a component of a larger device or system, may be distributed across a network or multiple devices connected by a network, etc.

Figure 10:
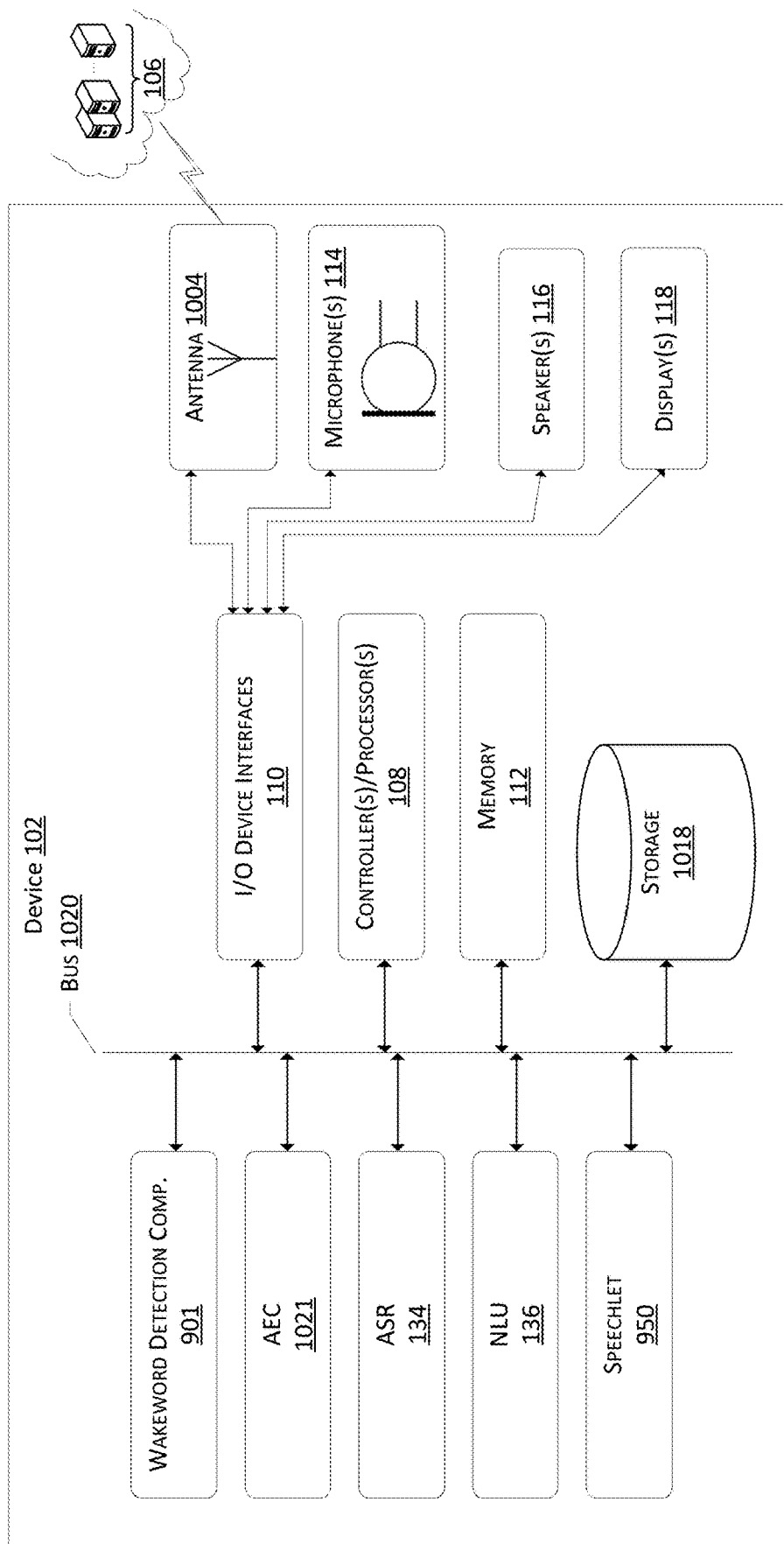

FIG. 10 illustrates a conceptual diagram of components of an example device from which message data may be received and/or sent to. For example, the device may include one or more electronic devices such as voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The device 102, 104 may be implemented as a standalone device that is relatively simple in terms of functional capabilities with limited input/output components, memory, and processing capabilities. For instance, the device 102, 104 may not have a keyboard, keypad, touchscreen, or other form of mechanical input. In some instances, the device 102, 104 may include a microphone 114, a power source, and functionality for sending generated audio data via one or more antennas 1004 to another device and/or system.

The device 102, 104 may also be implemented as a more sophisticated computing device, such as a computing device similar to, or the same as, a smart phone or personal digital assistant. The device 102, 104 may include a display with a touch interface and various buttons for providing input as well as additional functionality such as the ability to send and receive communications. Alternative implementations of the device 102, 104 may also include configurations as a personal computer. The personal computer may include input devices such as a keyboard, a mouse, a touchscreen, and other hardware or functionality that is found on a desktop, notebook, netbook, or other personal computing devices. In examples, the device 102, 104 may include an automobile, such as a car. In other examples, the device 102, 104 may include a pin on a user's clothes or a phone on a user's person. In examples, the device 102, 104 and may not include speaker(s) and may utilize speaker(s) of an external or peripheral device to output audio via the speaker(s) of the external/peripheral device. In this example, the device 102, 104 might represent a set-top box (STB), and the device 102, 104 may utilize speaker(s) of another device such as a television that is connected to the STB for output of audio via the external speakers. In other examples, the device 102, 104 may not include the microphone(s) 114, and instead, the device 102, 104 can utilize microphone(s) of an external or peripheral device to capture audio and/or generate audio data. In this example, the device 102, 104 may utilize microphone(s) of a headset that is coupled (wired or wirelessly) to the device 102, 104. These types of devices are provided by way of example and are not intended to be limiting, as the techniques described in this disclosure may be used in essentially any device that has an ability to recognize speech input or other types of natural language input.

The device 102, 104 of FIG. 10 may include one or more controllers/processors 110, that may include a central processing unit (CPU) for processing data and computer-readable instructions, and memory 112 for storing data and instructions of the device 102, 104. In examples, the skills and/or applications described herein may be stored in association with the memory 112, which may be queried for content and/or responses as described herein. The device 102, 104 may also be connected to removable or external non-volatile memory and/or storage, such as a removable memory card, memory key drive, networked storage, etc., through input/output device interfaces 110.

Computer instructions for operating the device 102, 104 and its various components may be executed by the device's controller(s)/processor(s) 108, using the memory 112 as "working" storage at runtime. A device's computer instructions may be stored in a non-transitory manner in non-volatile memory 112, storage 1018, or an external device(s). Alternatively, some or all of the executable instructions may be embedded in hardware or firmware on the device 102, 104 in addition to or instead of software.

The device 102, 104 may include input/output device interfaces 110. A variety of components may be connected through the input/output device interfaces 110. Additionally, the device 102, 104 may include an address/data bus 1020 for conveying data among components of the respective device. Each component within a device 102, 104 may also be directly connected to other components in addition to, or instead of, being connected to other components across the bus 1020.

The device 102, 104 may include a display, which may comprise a touch interface. Any suitable display technology, such as liquid crystal display (LCD), organic light emitting diode (OLED), electrophoretic, and so on, may be utilized for the displays. Furthermore, the processor(s) 110 may comprise graphics processors for driving animation and video output on the associated display. As a way of indicating to a user that a connection between another device has been opened, the device 102, 104 may be configured with one or more visual indicators, such as the light element(s), which may be in the form of LED(s) or similar components (not illustrated), that may change color, flash, or otherwise provide visible light output, such as for a notification indicator on the device 102, 104. The input/output device interfaces 110 that connect to a variety of components. This wired or a wireless audio and/or video port may allow for input/output of audio/video to/from the device 102, 104. The device 102, 104 may also include an audio capture component. The audio capture component may be, for example, a microphone 114 or array of microphones, a wired headset or a wireless headset, etc. The microphone 114 may be configured to capture audio. If an array of microphones is included, approximate distance to a sound's point of origin may be determined using acoustic localization based on time and amplitude differences between sounds captured by different microphones of the array. The device 102, 104 (using microphone 114, wakeword detection component 1001, ASR component 134, etc.) may be configured to generate audio data corresponding to captured audio. The device 102, 104 (using input/output device interfaces 110, antenna 1004, etc.) may also be configured to transmit the audio data to the system 106 for further processing or to process the data using internal components such as a wakeword detection component 901.

Via the antenna(s) 1004, the input/output device interface 110 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102, 104 via wired connection to an external alternating current (AC) outlet, and/or via onboard power sources, such as batteries, solar panels, etc.

Through the network(s), the system may be distributed across a networked environment. Accordingly, the device 102, 104 and/or the system 106 may include an ASR component 134. The ASR component 134 of device 102, 104 may be of limited or extended capabilities. The ASR component 134 may include language models stored in ASR model storage component, and an ASR component 138 that performs automatic speech recognition. If limited speech recognition is included, the ASR component 134 may be configured to identify a limited number of words, such as keywords detected by the device, whereas extended speech recognition may be configured to recognize a much larger range of words.

The device 102, 104 and/or the system 106 may include a limited or extended NLU component 136. The NLU component 136 of device 102, 104 may be of limited or extended capabilities. The NLU component 136 may comprise a name entity recognition module, an intent classification module and/or other components. The NLU component 136 may also include a stored knowledge base and/or entity library, or those storages may be separately located.

In examples, AEC may also be performed by the device 102, 104. In these examples, the operations may include causing the AEC component 1021 to be enabled or otherwise turned on, or the operations may include causing the AEC component 1021 to transition from a first mode to a second mode representing a higher sensitivity to audio data generated by the microphone 114. The AEC component 1021 may utilize the audio data generated by the microphone 114 to determine if an audio fingerprint of the audio data, or portion thereof, corresponds to a reference audio fingerprint associated with the predefined event.

The device 102, 104 and/or the system 106 may also include a speechlet 950 that is configured to execute commands/functions associated with a spoken command as described herein. The device 102, 104 may include a wakeword detection component 901, which may be a separate component or may be included in an ASR component 134. The wakeword detection component 901 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102, 104 may be configured collectively to identify a set of the directional audio signals in which the wake expression is detected or in which the wake expression is likely to have occurred.

Figure 11:
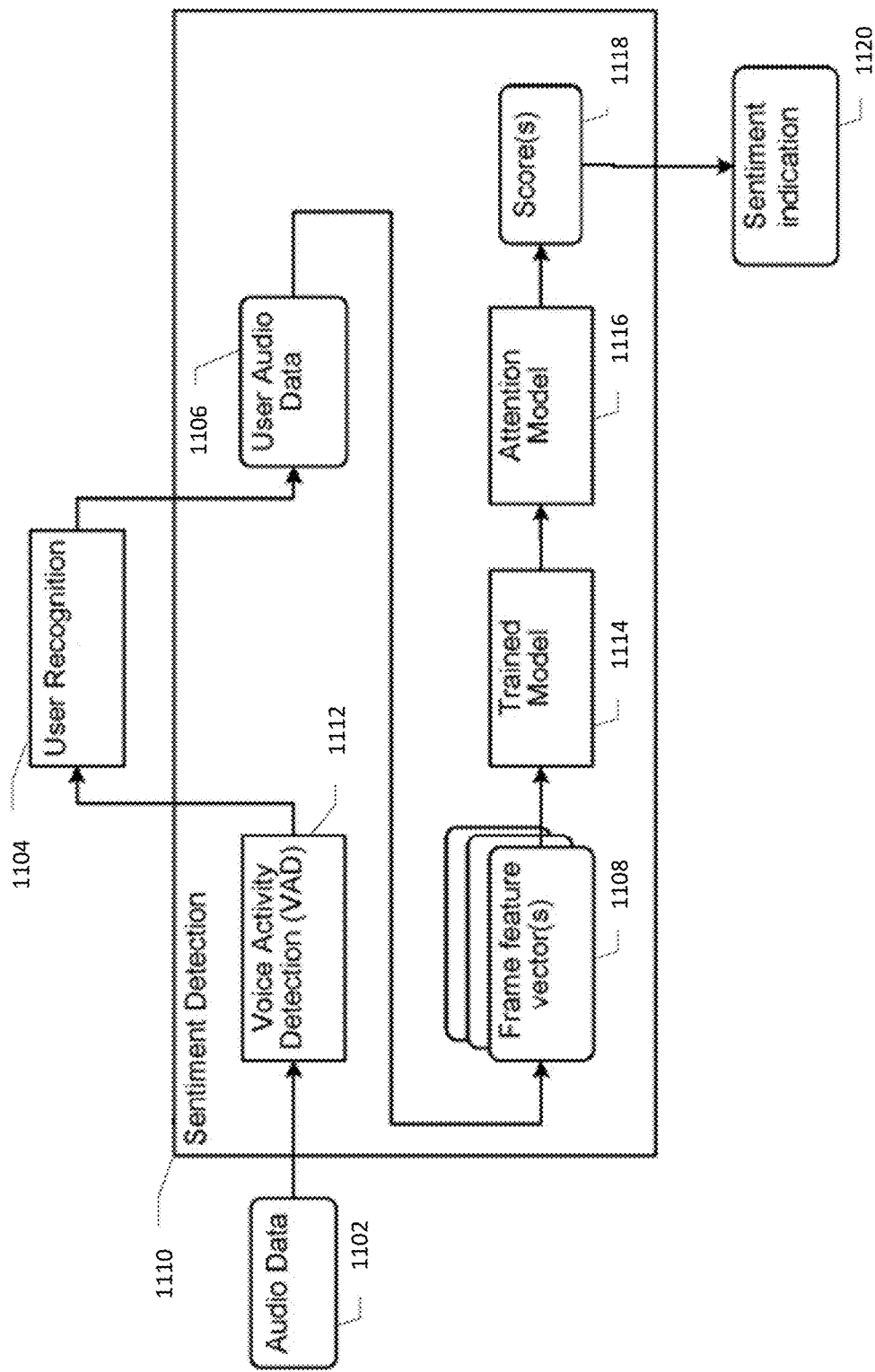
FIG. 11 is a schematic illustration of an example use case for determining a sentiment indication in accordance with one or more example embodiments of the disclosure.

FIG. 11 is a conceptual diagram illustrating sentiment detection via a sentiment engine according to embodiments of the present disclosure. The sentiment detection component 1110 may include a voice activity detection (VAD) component 1112, a trained model 1114 and an attention model 1116. The audio data 1102 (e.g., captured by an electronic device) may be inputted into the VAD component 1112. The sentiment detection component 1110 may reside with the electronic device, with another device proximate to, and in communication with the electronic device or with a remote device such as with a sever. If the sentiment detection component 1110 does not reside on the electronic device that is capturing audio, the sentiment detection component 1110 may not necessarily include the VAD component 1112 (or may not necessarily include other components) and may or may not include other components as well. The precise composition of the sentiment detection component 1110 depends on system configuration.

The VAD component 1112 may determine if the audio data 1102 includes speech spoken by a human or voice activity by a human, and may determine a portion of the audio data 1102 that includes speech or voice activity. The VAD component 1112 may send the portion of the audio data 1102 including speech or voice activity to the user recognition component 1104. The VAD component 1112 may employ voice activity detection techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD component 1112 may implement a limited classifier configured to distinguish speech from background noise. The classifier may be implemented by techniques such as linear classifiers, support vector machines, and decision trees. In still other examples, the electronic device may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user recognition component 1104 (which may be located on a same or different device as the sentiment detection component 1110) may communicate with the sentiment detection component 1110 to determine user audio data 1106 that corresponds to a particular user profile. The user recognition component 1104 may recognize one or more users. For example, the user recognition component 1104 may identify stored data corresponding to a voice profile associated with the user profile, and determine a confidence level that a portion of the input audio data corresponds to the voice profile based on analyzing the stored data. The user recognition component 1104 may determine if the confidence level meets/satisfies a threshold. If the confidence level for a portion of the input audio data is below a threshold, then the respective portion of input audio is discarded as it does not represent speech from the user associated with the user profile. If the confidence level for a portion of the input audio data meets/satisfies a threshold, then the respective portion of the input audio data is stored as the user audio data 1106.

The user audio data 1106 may be a portion of the audio data 1102 that includes speech or one or more utterances from a particular user associated with the user profile. In other words, audio data representing a particular user's speech may be isolated and stored as the user audio data 1106 for further analysis. In an example embodiment, the user may be associated with or using the electronic device, and may have provided permission to record and analyze his or her voice/conversations to determine a sentiment indication corresponding to the conversation.

Prior to performing further analysis on the user audio data 1106, the sentiment detection component 1110 may confirm that the user has granted permissions to analyze speech spoken by the user for sentiment detection.

The user audio data 1106 may be input into an encoder to determine frame feature vector(s) 1108. The frame feature vector(s) may represent audio frame level features extracted from the user audio data 1106. One frame feature vector 1108 may represent features extracted for a window of audio (e.g., 25 ms), where the window slides or moves in increments (e.g., increments of 10 ms) to extract features represented by the next frame feature vector. In other embodiments, one frame feature vector 1108 may represent features corresponding to an individual word in the utterance. The sentiment detection component 1110 may determine the portions of user audio data 1106 that correspond to individual words and extracts features from the respective portions of audio using the encoder. The frame feature vector(s) 1108 may be derived by spectral analysis of the user audio data 1106.

In an example embodiment, the sentiment detection component 1110 determines that the user audio data 1106 includes an entire utterance. That is, the sentiment detection component 1110 may determine that a begin point of the user audio data 1106 corresponds to a begin point of an utterance, and an endpoint of the user audio data 1106 corresponds to an endpoint of the utterance. In this case, the frame feature vectors 1108 may represent the words in the entire utterance.

The trained model 1114 may process the frame feature vector(s) 1108. The trained model 1114 is trained on acoustic and lexical features and may be a combined sentiment detection model. Even though only acoustic features may be available for sentiment detection, the trained model 1114 is configured to infer some semantic and contextual features learned from lexical information during training.

The trained model 1114 may be a neural network, for example a bi-directional LSTM. The output of the trained model 1114 may be fed into an attention model 1116. The attention model 1116 may be a neural network, for example a recurrent neural network. The attention model 1116 may be configured to emphasize relevant portions of an input utterance. The attention model 1116 may be configured to take in output data from the trained model 1114 and produce an output for every time step (e.g., a 10 ms audio frame). The attention model 1116 may be configured to aggregate information from different time intervals/audio frames of the input audio data to determine how certain parts of the utterance affects determining of the sentiment. For example, an acoustic representation of a first word in the utterance may indicate a high arousal implying anger, in which case the attention model 1116 is configured to realize that the first word corresponds to an anger sentiment and that that should affect the processing of the other words in the utterance to ultimately determine a sentiment category corresponding to the utterance. In some embodiments, the functionality described here of the attention model 1116 may be performed by one or more layers of the trained model 1114. That is, the attention model 1116 may be part of the trained model 1114 and may not be a separate component from the trained model 1114. One or more layers of the trained model 1114 may be trained to perform the functionalities of the attention model 1116.

The attention model 1116 may output a score 1118 indicating a likelihood of the utterance corresponding to a sentiment indication 1120. The attention model 1118 may output model output data including an indicator of a sentiment or a N-best list of scores. The sentiment detection component 1110 may predict from multiple sentiment categories, including but not limited to, happiness, sadness, anger and neutral. In an example embodiment, the sentiment indicator 1120 may be determined after score(s) 1118 have been determined for a particular period of time of input audio data. In an example embodiment, the sentiment categories may be broad such as positive, neutral, and negative or may be more precise such as angry, happy, distressed, surprised, disgust, or the like.

In some embodiments, the sentiment detection component 1110 is configured to determine a sentiment indication 1120 at an utterance-level. The sentiment detection component 1110 may use contextual information from the entire utterance to determine an overall sentiment of the speaker when speaking the utterance. The sentiment detection component 1110 may also use information conveyed by individual words in the utterance to determine the sentiment of the speaker when speaking the utterance. For example, particular words may represent a particular sentiment or emotion because of its meaning (lexical information), while some words may represent a particular sentiment or emotion because of the way it is spoken by the user (acoustic information). In other embodiments, the sentiment detection component 1110 may be configured to determine a sentiment category on a word level (that is for each word within an utterance).

The trained model 1114 may take many forms, including a neural network. The trained model 1114 may employ a bi-directional LSTM. A neural network may include a number of layers, from input layer 1 through output layer N. Each layer includes one or more nodes and is configured to input a particular type of data and output another type of data. A layer may be represented by a data structure that represents the connections between layers and operations within a layer. The neural network may be configured to input data of type data A (which is the input to layer 1) and output data of type data Z (which is the output from the last layer N). The output from one layer is then taken as the input to the next layer. For example, the output data (data B) from layer 1 is the input data for layer 2 and so forth such that the input to layer N is data Y output from the penultimate layer (not shown). While values for the input data/output data of a particular layer are not known until a neural network is actually operating during runtime, the data describing the neural network describes the structure and operations of the layers of the neural network.

The sentiment detection as described herein may be utilized to determine a sentiment of a user and utilize that sentiment for determine when to save given image data for generating personalized emojis.

Figure 12A:
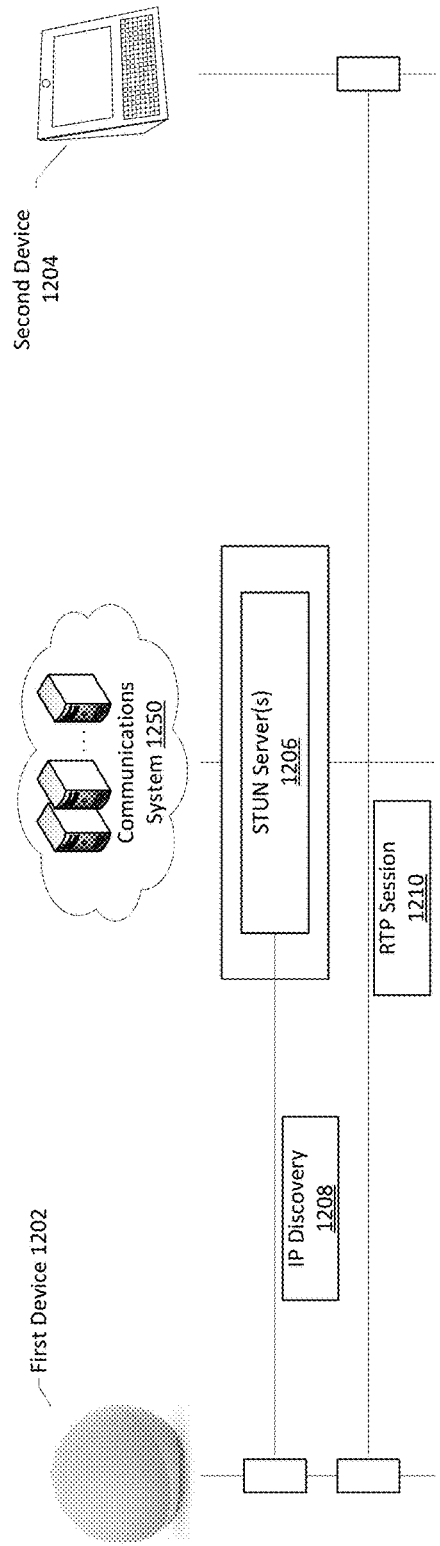
FIGS. 12A and 12B illustrate example components for establishing a flow of data between devices.
Figure 12B:
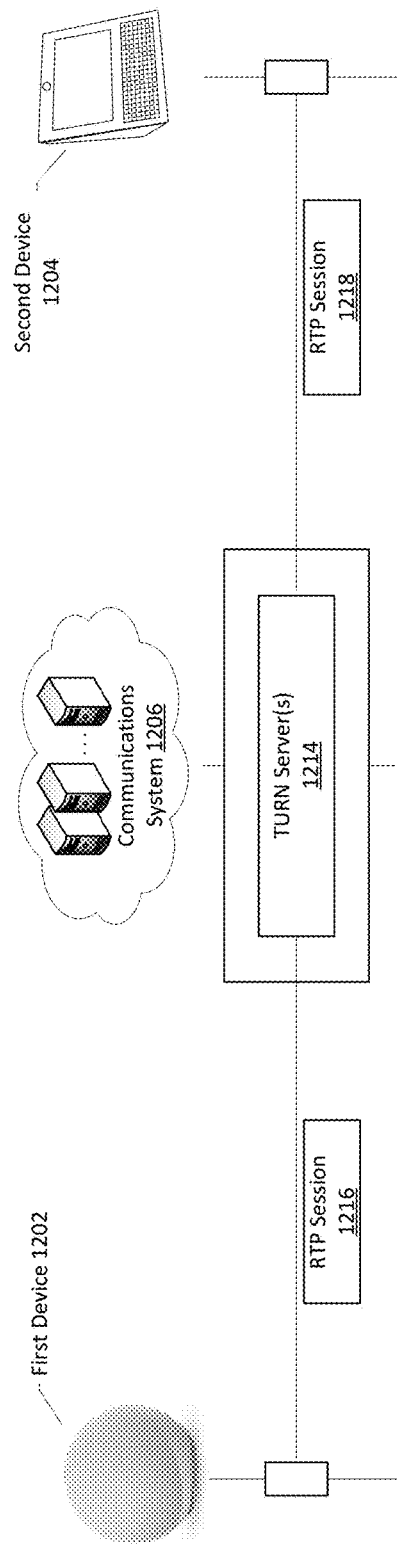

FIGS. 12A and 12B illustrate example components for establishing a flow of data between devices. For instances, FIGS. 12A and 12B illustrates examples of establishing media streams between devices according to the present disclosure. In examples, the first device 1202 may have a publicly accessible IP address and may be configured to establish the RTP communication session directly with the second device 1204. To enable the first device 1202 to establish the RTP communication session, the communications system 1250 may include Session Traversal of User Datagram Protocol (UDP) Through Network Address Translators (NATs) server(s), such as STUN server(s) 1206. The STUN server(s) 1206 may be configured to allow NAT clients, such as a first device 1202 behind a firewall, to setup calls to a VoIP provider and/or a messaging provider hosted outside of the local network by providing a public IP address, the type of NAT they are behind, and a port identifier associated by the NAT with a particular local port. As illustrated in FIG. 12A, the first device 1202 may perform, at block 1208, IP discovery using the STUN server(s) 1206 and may use this information to set up an RTP communication session 1210, such as a UDP communication, between the first device 1202 and the second device 1204 to establish a call.

In some examples, the first device 1202 may not have a publicly accessible IP address. For example, in some types of NAT the first device 1202 cannot route outside of the local network. To enable the first device 1202 to establish an RTP communication session, the communications system 1250 may include Traversal Using relays around NAT (TURN) server(s) 1214. The TURN server(s) 1214 may be configured to connect the first device 1202 to the second device 1204 when the first device 1202 is behind a NAT. As illustrated in FIG. 12B, the first device 1202 may establish, at block 1216, an RTP session with the TURN server(s) 1214 and the TURN server(s) 1214 may establish, at block 1218, an RTP session with the second device 1204. Thus, the first device 1202 may communicate with the second device 1204 via the TURN server(s) 1214. For example, the first device 1202 may send outgoing audio data to the communications system 1250 and the communications system 1250 may send the outgoing audio data to the second device 1204. Similarly, the second device 1204 may send incoming audio/video data to the communications system 1250 and the communications system 1250 may send the incoming data to the first device 1202.

In some examples, the communications system 1250 may establish communication sessions using a combination of the STUN server(s) 1206 and the TURN server(s) 1214. For example, a communication session may be more easily established/configured using the TURN server(s) 1214, but may benefit from latency improvements using the STUN server(s) 1206. Thus, the system may use the STUN server(s) 1206 when the communication session may be routed directly between two devices and may use the TURN server(s) 1214 for all other communication sessions. Additionally, or alternatively, the system may use the STUN server(s) 1206 and/or the TURN server(s) 1214 selectively based on the communication session being established. For example, the system may use the STUN server(s) 1206 when establishing a communication session between two devices (e.g., point-to-point) within a single network (e.g., corporate LAN and/or WLAN), but may use the TURN server(s) 1214 when establishing a communication session between two devices on separate networks and/or three or more devices regardless of network(s). When the communication session goes from only two devices to three or more devices, the system may need to transition from the STUN server(s) 1206 to the TURN server(s) 1214. Thus, if the system anticipates three or more devices being included in the communication session, the communication session may be performed using the TURN server(s) 1214.

Figure 13:
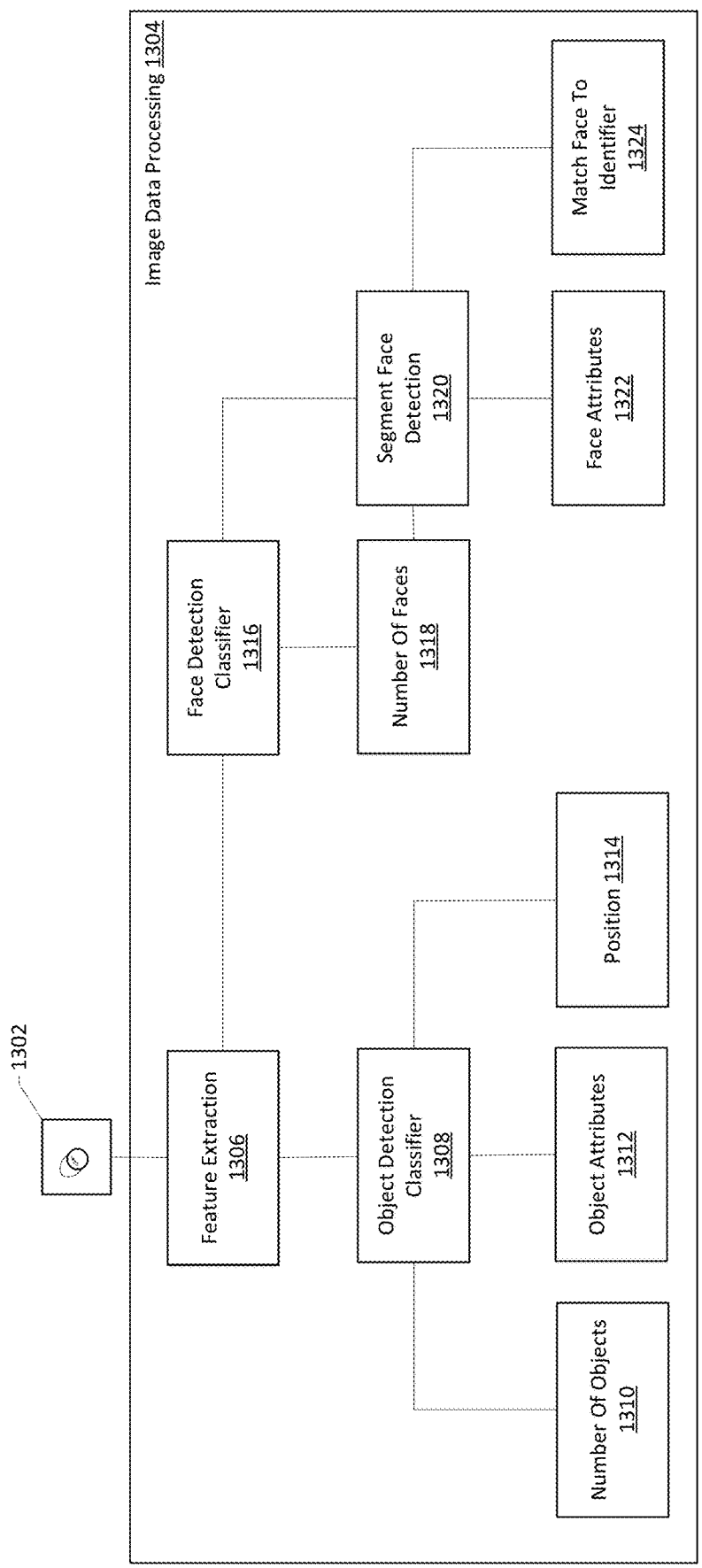
FIG. 13 is a schematic diagram of a process for detecting objects in image data.

FIG. 13 is a schematic diagram of an example process for detecting objects in image data. For example, a camera apparatus 1302 acquires image data for processing using image data processing 1304. In some instances, the image data processing 1304 can be performed by the camera apparatus 1302. In some instances, the image data processing 1304 can be performed by the system 106. For instance, the system 106 can receive the image data from the camera apparatus 1302, and then perform the image data processing 1304.

To process the image data, the image data processing 1304 can use one or more image processing techniques (e.g., facial recognition, object recognition, etc.) to extract features 1306 from the image data. In some instances, the features can include objects (e.g., guests, robots, etc.) and faces. For instance, the image data processing 1304 can identify each object and face that is within the image data.

For objects, the image data processing 1304 may include an object detection classifier 1308 in order to detect a number of objects 1310 within the environment, attributes 1312 (e.g., characteristics) associated with each of the objects, and a position 1314 for each of the objects. For instance, the number of objects 1310 can include how many objects are at the environment. The attributes 1312 associated with each object can include a height of the object, hair color of the object, an approximate weight of the object (e.g., 100 pounds), a body type for the object (e.g., slim, etc.), clothes that the object is wearing, facial recognition of the object, or the like. The position 1314 can include a specific position outside and/or inside of the environment for the object or person.

For faces, the image data processing 1304 can apply a face detection classifier 1316 in order to detect a number of faces 1318. Additionally, for each face, the image data processing 1304 can perform segment face detection 1320 in order to determine attributes 1322 (e.g., characteristics) for each of the faces at the environment and detect an identifier 1324 for each of the faces at the environment.

Attributes 1322 for each face can include a relative size, a color, a shape of the face, or the like. An identifier 1324 for a face can include any type of identity, such as a user profile identifier.

When image data is described herein as being analyzed, that analysis may include the use of computer vision to identify objects depicted in the image data. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)— Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: Lines, edges, and ridges; Localized interest points such as corners, blobs, or points; More complex features may be related to texture, shape, or motion. At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classifying a detected object into different categories; and comparing and combining two different views of the same object. Making the final decision required for the application, for example match/no-match in recognition applications, may then be performed.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
   one or more processors; and
   non-transitory computer-readable media storing computer-executable instructions that, when executed by the one or more processors, cause the one or more processors to perform operations comprising:
   receiving first user input data requesting that images of a user be captured during a video call to be utilized for generating a personalized emoji of the user;
   determining that a device associated with a user profile of the user is involved in the video call;
   in response to the device being involved in the video call, generating image data corresponding to the images of the user;

determining, from the image data and utilizing computer vision techniques, that an image of the images depicts the user with a predefined facial expression;

saving a portion of the image data corresponding to the image in response to the image depicting the user with the predefined facial expression;

in response to determining that the video call has ended, displaying, on the device, the image depicting the user with the predefined facial expression;

receiving second user input data accepting the image as the personalized emoji of the user; and storing the portion of the image data in a database associated with personalized emojis of the user such that a character code utilized for a preexisting emoji is associated with the portion of the image data, the character code utilized for presenting an option to utilize the personalized emoji.

2. The system of claim 1, the operations further comprising:

receiving audio data representing words spoken by the user during the video call;

determining that a volume characteristic of the audio data satisfies a threshold volume characteristic at a time when the image was captured; and wherein saving the portion of the image data is in response to the volume characteristic satisfying the threshold volume characteristic.

3. The system of claim 1, the operations further comprising:

receiving audio data representing words spoken by the user during the video call;

determining, from the audio data, text data indicating words spoken by the user during the video call;

identifying, from the text data, a word predefined to be associated with the predefined facial expression;

determining that the word was spoken by the user at a time when the image was captured; and wherein saving the portion of the image data is in response to identifying the word as spoken by the user when the image was captured.

4. The system of claim 1, the operations further comprising:

causing output, on the device, of a recommendation to utilize the personalized emoji to respond to first message data received at the device;

receiving third user input data accepting the recommendation; and sending second message data configured to be utilized to display the personalized emoji.

5. A method, comprising:

generating, based at least in part on determining that a device is involved in a video call, image data corresponding to images of a user, wherein the device is associated with a user profile indicating a request for generating a personalized emoji of the user;

determining, based at least in part on the image data, that an image of the images depicts the user with a predefined facial expression;

saving a portion of the image data corresponding to the image in response to the image depicting the user with the predefined facial expression;

based at least in part on determining that the video call has ended, displaying, on the device, the image depicting the user with the predefined facial expression;

receiving first user input data accepting the image as the personalized emoji of the user; and storing the portion of the image data in a database associated with personalized emojis of the user such that a character code utilized for a preexisting emoji is associated with the portion of the image data, the character code utilized for presenting an option to utilize the personalized emoji.

6. The method of claim 5, further comprising:

receiving audio data representing words spoken by the user when the images were captured;

determining that a volume characteristic of the audio data satisfies a threshold volume characteristic at a time when the image was captured; and wherein saving the portion of the image data comprises saving the portion of the image data based at least in part on the volume characteristic satisfying the threshold volume characteristic.

7. The method of claim 5, further comprising:

receiving audio data representing words spoken by the user when the images were captured;

determining, based at least in part on analysis of the audio data, words spoken by the user when the images were captured;

identifying a word of the words that is associated with the predefined facial expression;

determining that the word was spoken by the user at a time when the image was captured; and wherein saving the portion of the image data comprises saving the portion of the image data based at least in part on identifying the word as spoken by the user when the image was captured.

8. The method of claim 5, further comprising:

causing output, on the device, of a recommendation to utilize the personalized emoji to respond to first message data received at the device;

receiving third user input data accepting the recommendation; and sending second message data configured to be utilized to display the personalized emoji.

9. The method of claim 5, further comprising:

determining that first message data received at the device includes audio data representing an audio message;

generating, based at least in part on the audio data, text data indicating a textual representation of the audio message;

determining a subset of the personalized emojis that are associated with the textual representation of the audio message; and causing output, on the device, of a recommendation to utilize one or more the personalized emojis in the subset of the personalized emojis to respond to the first message data.

10. The method of claim 5, further comprising:

determining that first message data received at the device is associated with a message content category of multiple message content categories based at least in part on an application being utilized to send the first message data;

determining a subset of the personalized emojis that are associated with the message content category; and causing output, on the device, of a recommendation to utilize one or more the personalized emojis in the subset of the personalized emojis to respond to the first message data.

11. The method of claim 5, further comprising:

receiving second user input data requesting generation of the image data;

causing display, on the device and based at least in part on receiving the second user input data, a reference image depicting a facial expression and an instruction to mimic the facial expression; and wherein generating the image data comprises generating the image data from the images captured while causing display of the reference image.

12. The method of claim 5, further comprising:

capturing the images while the video call is occurring; and wherein generating the image data comprises generating the image data from the images captured while the video call is occurring.

13. A system, comprising:

one or more processors; and non-transitory computer-readable media storing computer-executable instructions that, when executed by the one or more processors, cause the one or more processors to perform operations comprising:

generating, based at least in part on detecting initiation of a video call at a device, image data corresponding to images of a user, wherein the device is associated with a request to generate a personalized emoji;

determining, based at least in part on the image data, that an image of the images depicts the user with a predefined facial expression;

saving a portion of the image data corresponding to the image in response to the image depicting the user with the predefined facial expression;

displaying, on the device and based at least in part on determining that the video call has ended, the image depicting the user with the predefined facial expression;

receiving first user input data accepting the image as the personalized emoji of the user; and storing the portion of the image data in a database associated with personalized emojis of the user such that a character code utilized for a preexisting emoji is associated with the portion of the image data, the character code utilized for presenting an option to utilize the personalized emoji.

14. The system of claim 13, the operations further comprising:

receiving audio data representing words spoken by the user when the images were captured;

determining that a volume characteristic of the audio data satisfies a threshold volume characteristic at a time when the image was captured; and wherein saving the portion of the image data comprises saving the portion of the image data based at least in part on the volume characteristic satisfying the threshold volume characteristic.

15. The system of claim 13, the operations further comprising:

receiving audio data representing words spoken by the user when the images were captured;

determining, based at least in part on analysis of the audio data, words spoken by the user when the images were captured;

identifying a word of the words that is associated with the predefined facial expression;

determining that the word was spoken by the user at a time when the image was captured; and wherein saving the portion of the image data comprises saving the portion of the image data based at least in part on identifying the word as spoken by the user when the image was captured.

16. The system of claim 13, the operations further comprising:

causing output, on the device, of a recommendation to utilize the personalized emoji to respond to first message data received at the device;

receiving third user input data accepting the recommendation; and sending second message data configured to be utilized to display the personalized emoji.

17. The system of claim 13, the operations further comprising:

determining that first message data received at the device includes audio data representing an audio message;

generating, based at least in part on the audio data, text data indicating a textual representation of the audio message;

determining a subset of the personalized emojis that are associated with the textual representation of the audio message; and causing output, on the device, of a recommendation to utilize one or more the personalized emojis in the subset of the personalized emojis to respond to the first message data.

18. The system of claim 13, the operations further comprising:

determining that first message data received at the device is associated with a message content category of multiple message content categories based at least in part on an application being utilized to send the first message data;

determining a subset of the personalized emojis that are associated with the message content category; and causing output, on the device, of a recommendation to utilize one or more the personalized emojis in the subset of the personalized emojis to respond to the first message data.

19. The system of claim 13, the operations further comprising:

receiving second user input data requesting generation of the image data;

causing display, on the device and based at least in part on receiving the second user input data, a reference image depicting a facial expression and an indication to mimic the facial expression; and wherein generating the image data comprises generating the image data from the images captured while causing display of the reference image.

20. The system of claim 13, the operations further comprising:

capturing the images while the video call is occurring; and wherein generating the image data comprises generating the image data from the images captured while the video call is occurring.

* * * * *